Figure 31A:
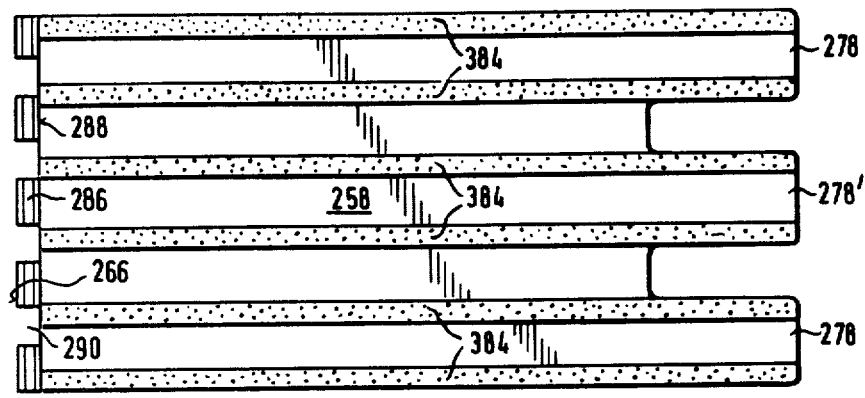

United States Patent [19]
Ackeret

[11] 4,376,348
[45] * Mar. 15, 1983

[54] PICTURE VIEWER

[75] Inventor: Peter Ackeret, Kusnacht, Switzerland

[73] Assignee: Licinvest AG, Chur, Switzerland

[ * ] Notice: The portion of the term of this patent subsequent to Jun. 20, 1998, has been disclaimed.

[21] Appl. No.: 138,641

[22] Filed: Apr. 8, 1980

[30] Foreign Application Priority Data

Apr. 9, 1979 [DE] Fed. Rep. of Germany ....... 2914351

[51] Int. Cl.³ ............................................ G09F 11/30
[52] U.S. Cl. ...................................... 40/513; 40/490; 40/511
[58] Field of Search ................. 40/375, 380, 381, 490, 40/508, 509, 511, 513

[56] References Cited

U.S. PATENT DOCUMENTS

| | | | |
|---|---|---|---|
| 3,377,727 | 4/1968 | Weggeland | 40/511 |
| 3,495,345 | 2/1970 | Weggeland | 40/490 |
| 3,783,540 | 1/1974 | Barclay | 40/511 |
| 4,057,920 | 11/1977 | Weggeland | 40/513 |
| 4,238,899 | 12/1980 | Ackert | 40/513 |
| 4,241,528 | 12/1980 | Ackert | 40/513 |
| 4,242,820 | 1/1981 | Ackert | 40/513 |
| 4,245,417 | 1/1981 | Ackeret | 40/511 |
| 4,259,802 | 4/1981 | Ackert | 40/513 |

*Primary Examiner*—Gene Mancene
*Assistant Examiner*—Michael J. Foycik, Jr.
*Attorney, Agent, or Firm*—Peterson, Palmatier, Sturm, Sjoquist & Baker, Ltd.

[57] ABSTRACT

A picture viewer has a housing for a pile of pictures, a window for viewing the pictures, and a slider which is used to transport a picture from one side of the pile and guided to the other side of the pile again as the slider is operated. A retaining device selectively operates to prevent the remainder of the pile from being transported out of the housing.

192 Claims, 143 Drawing Figures

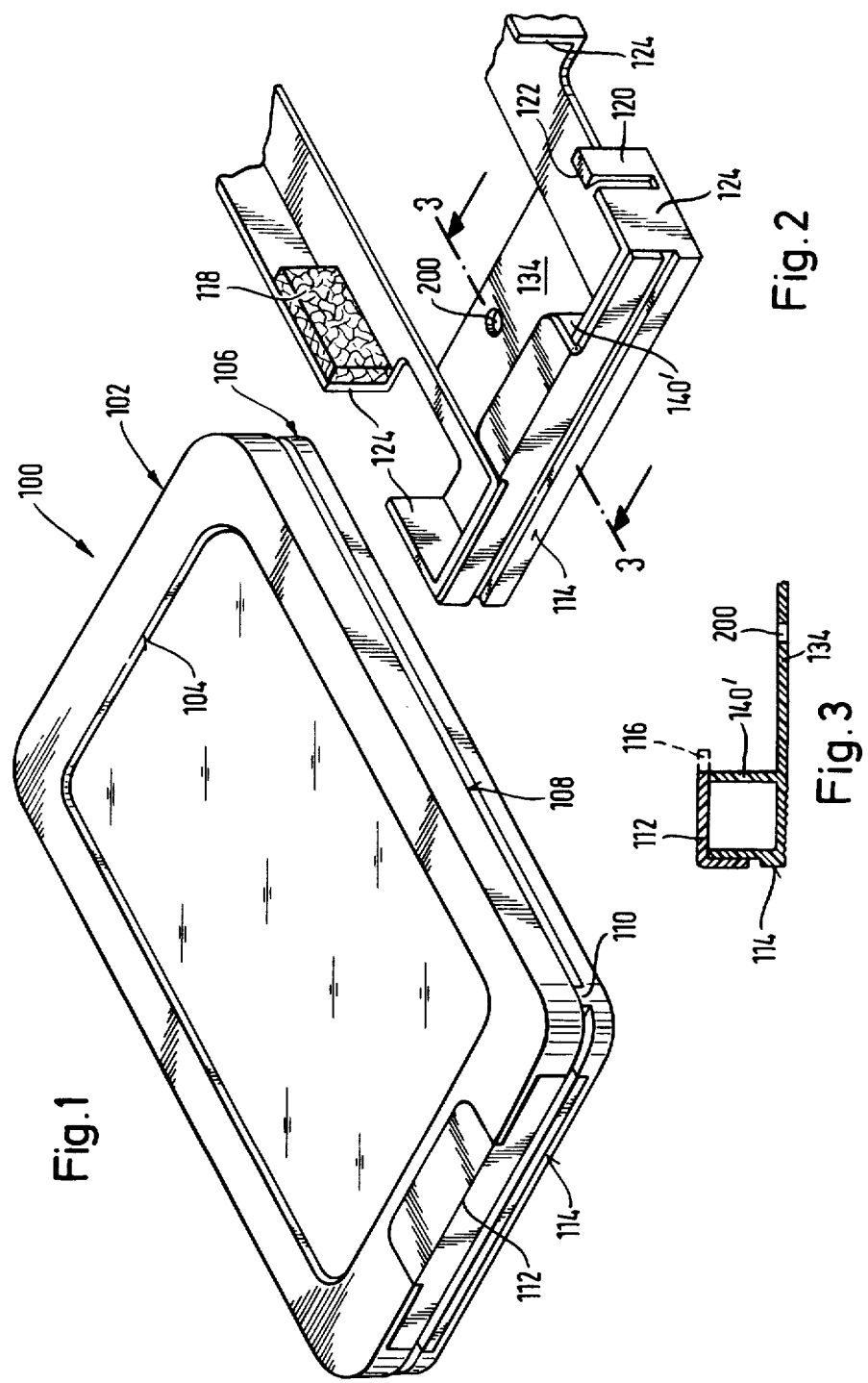

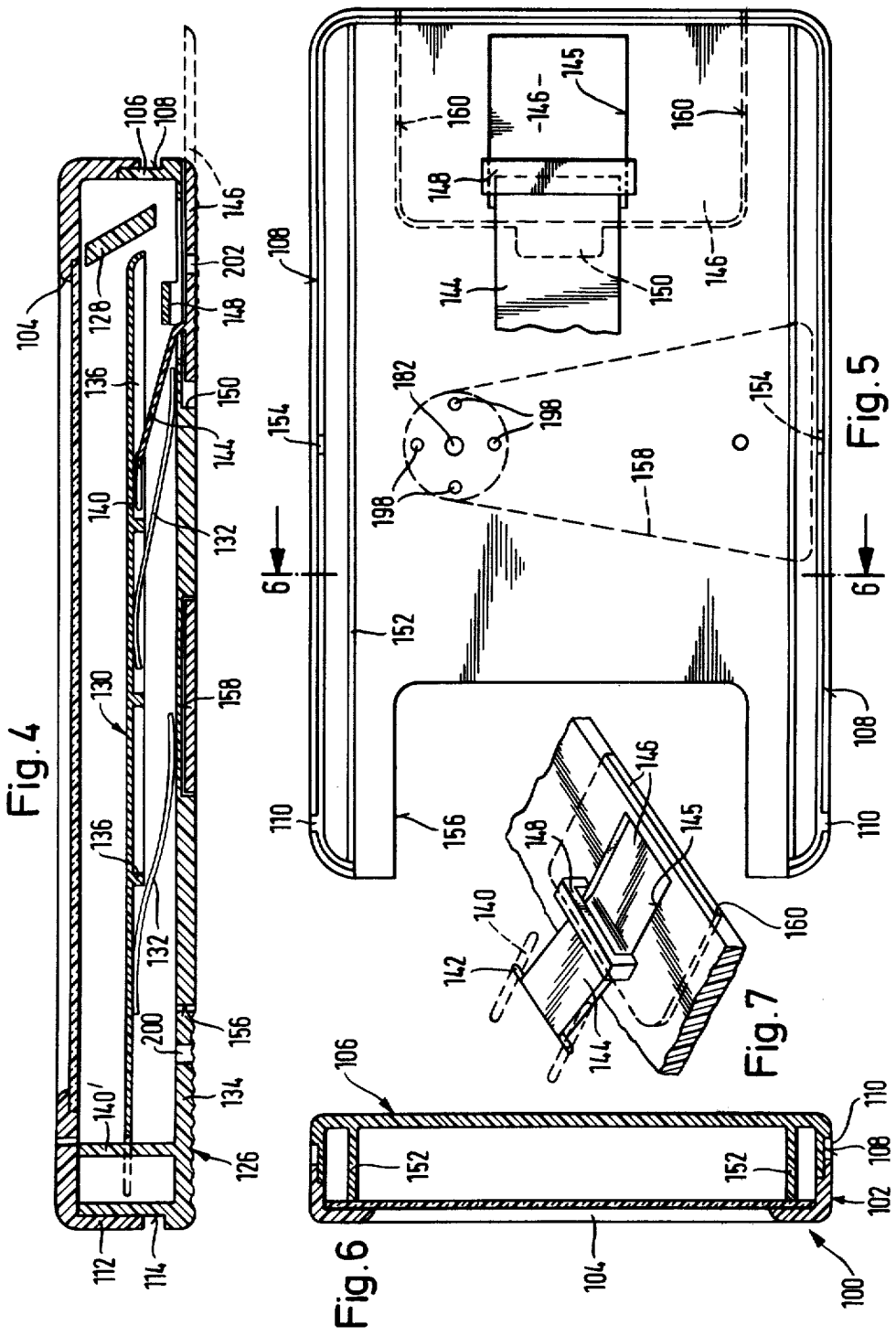

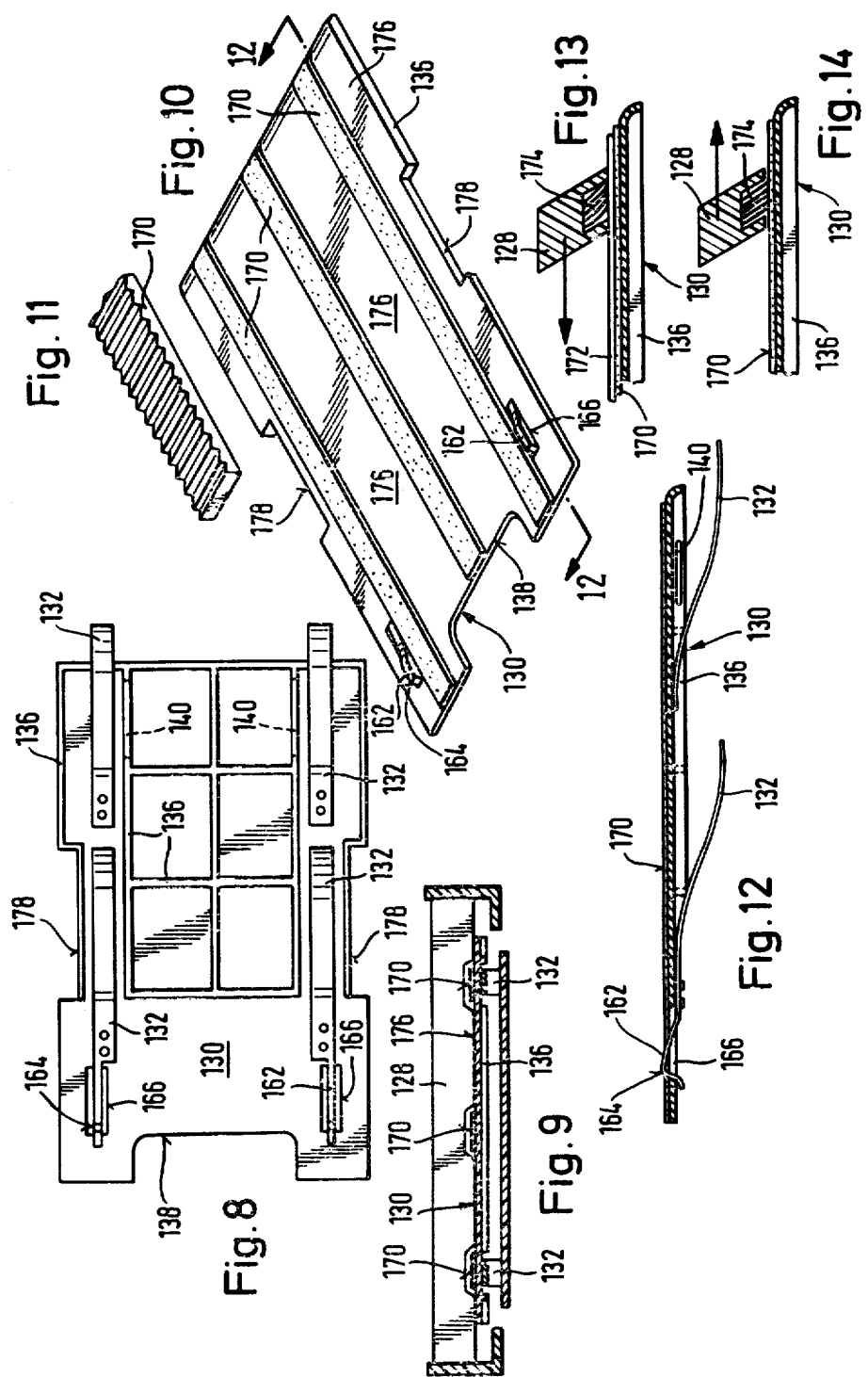

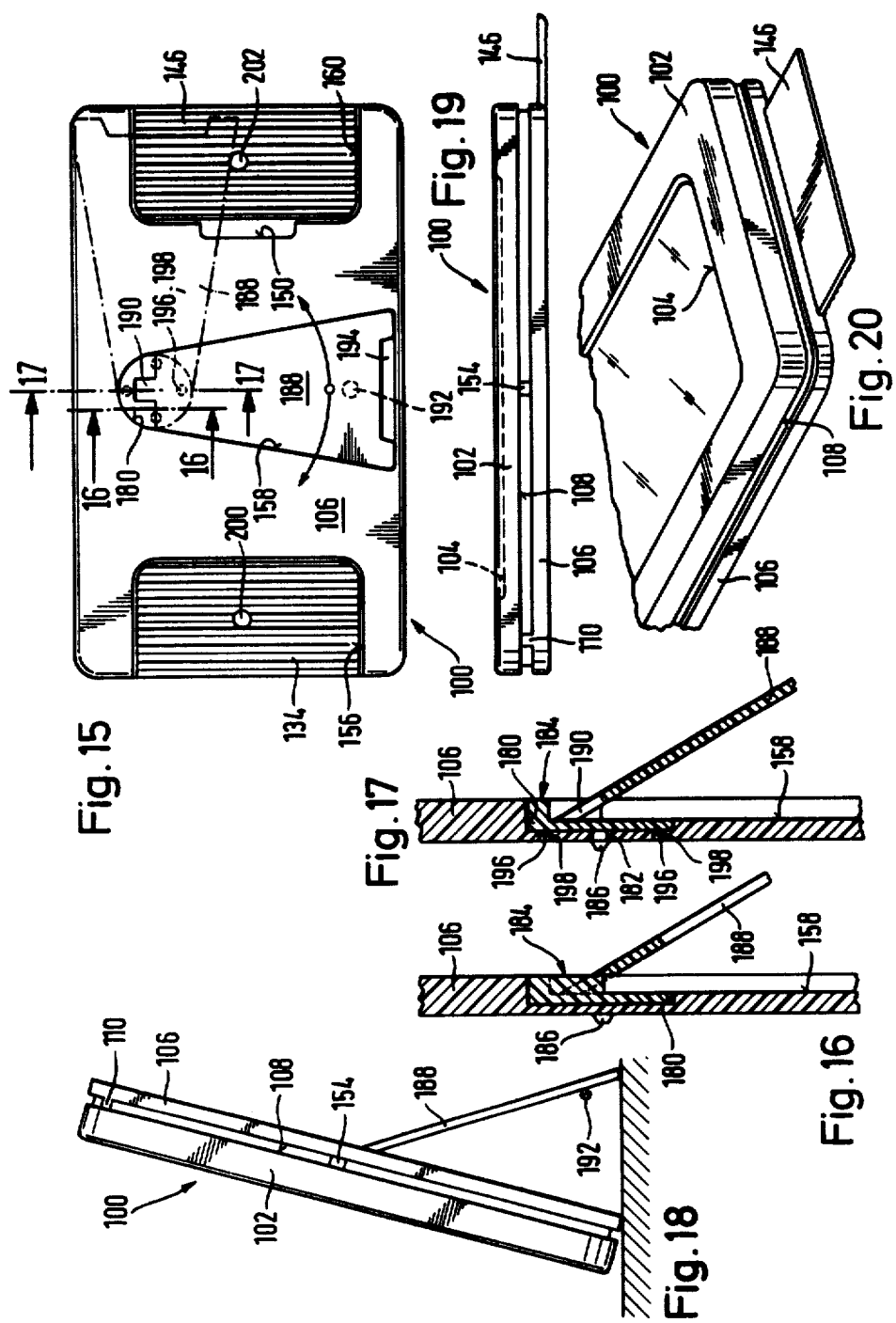

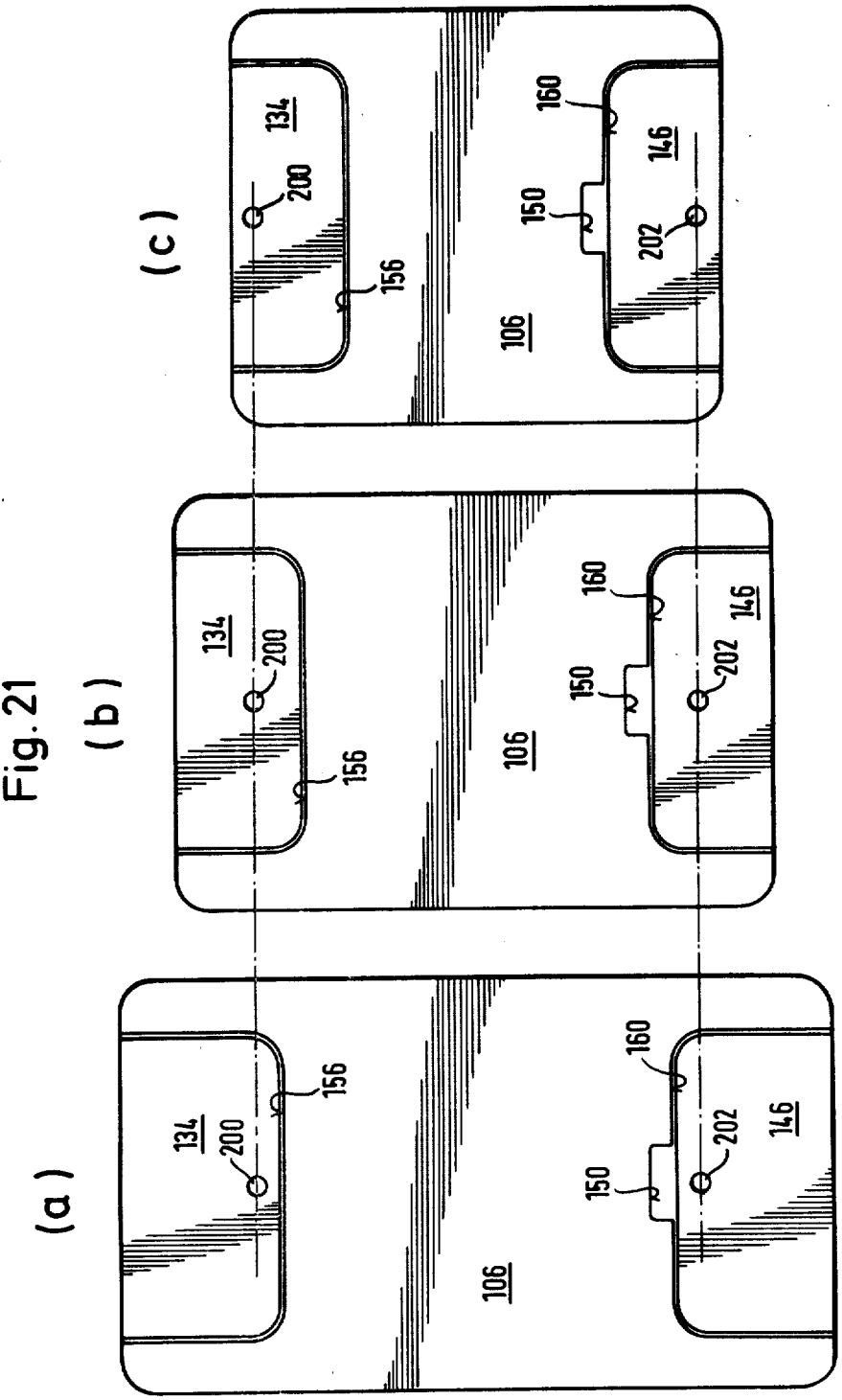

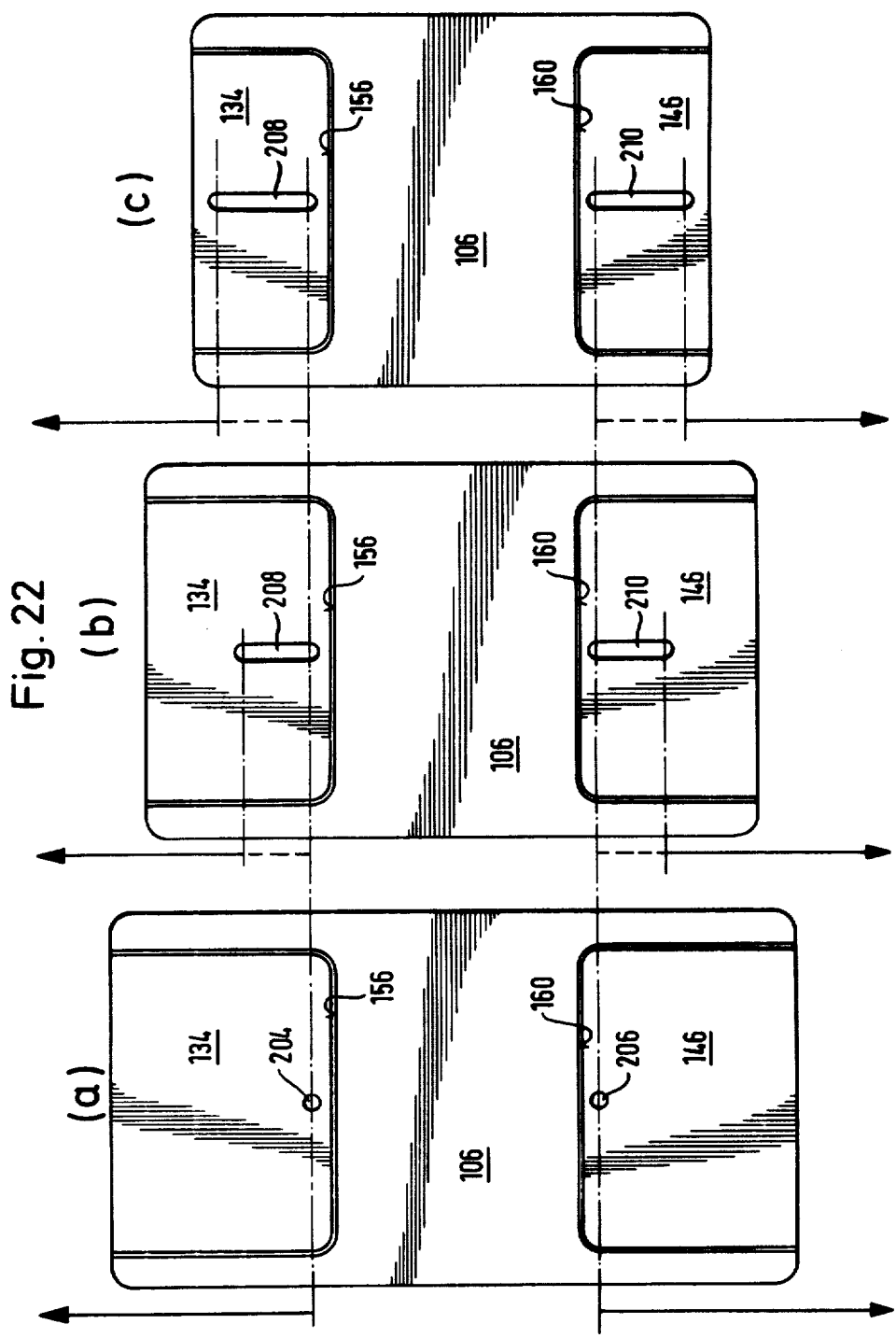

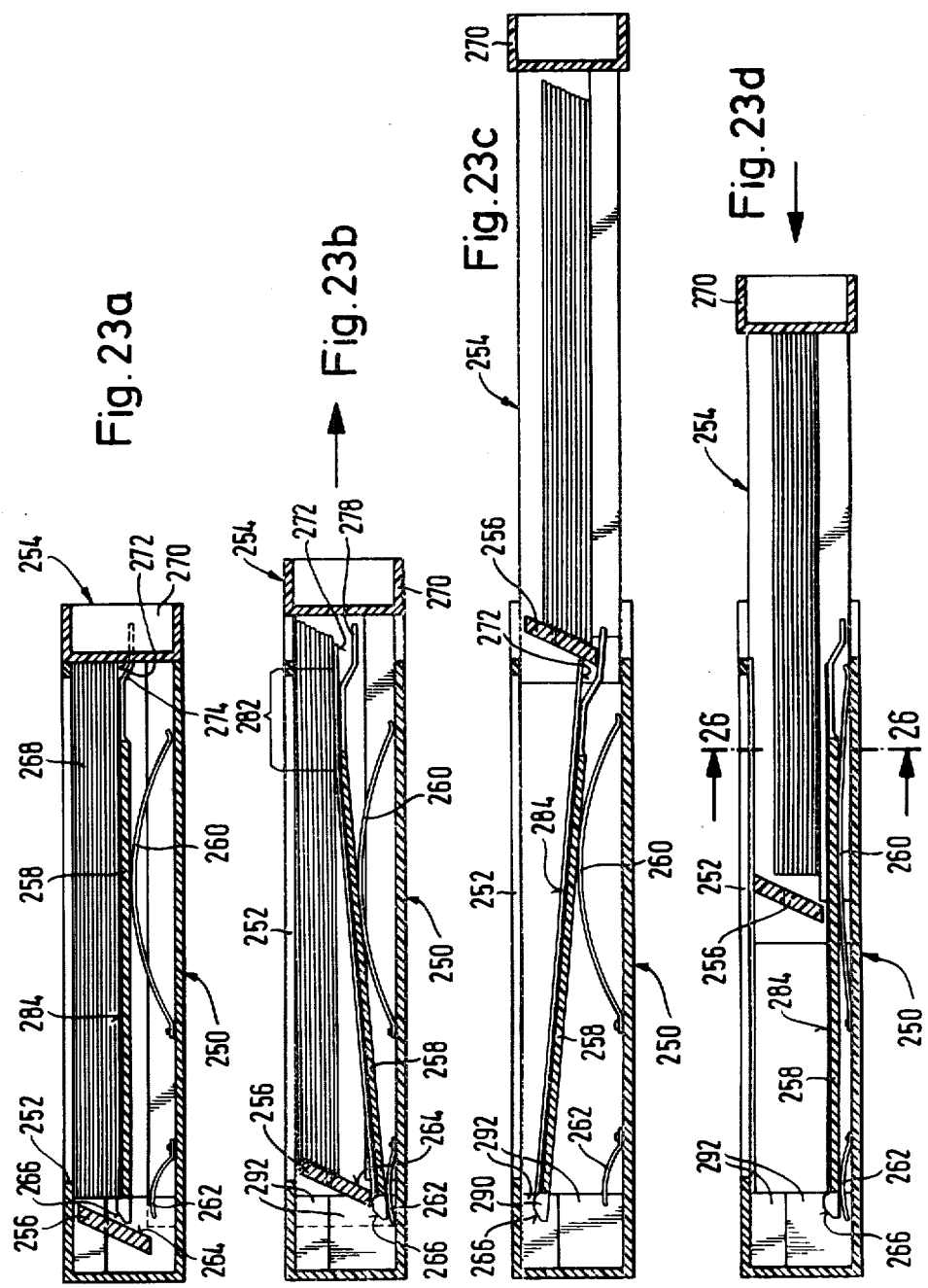

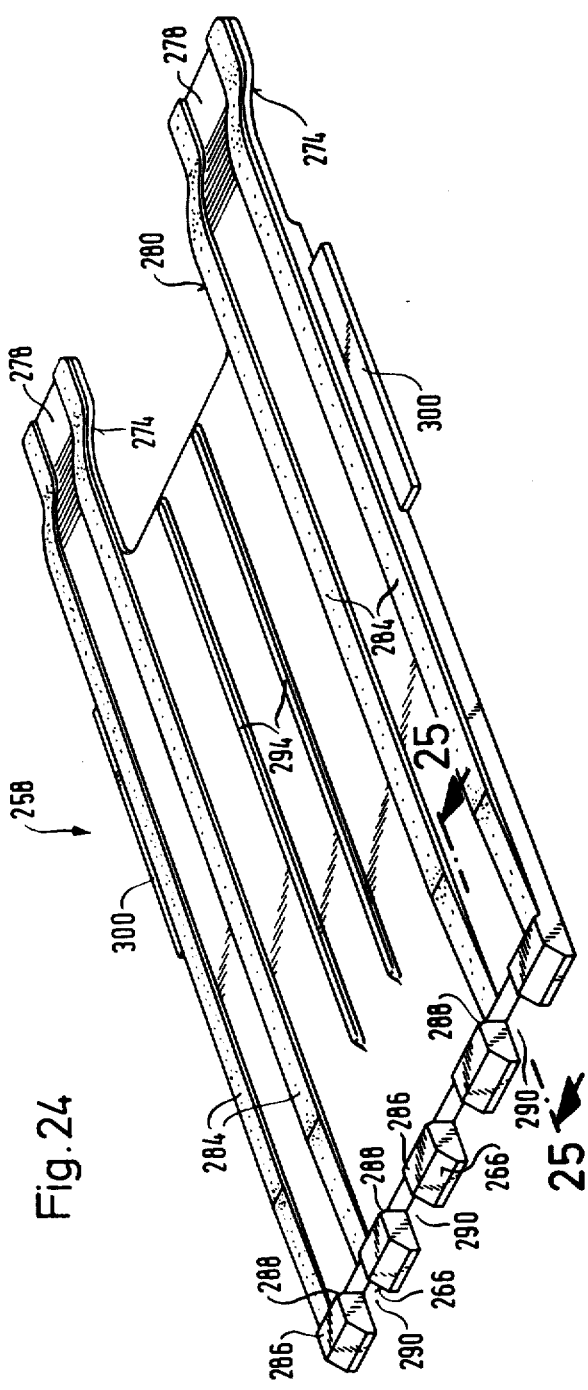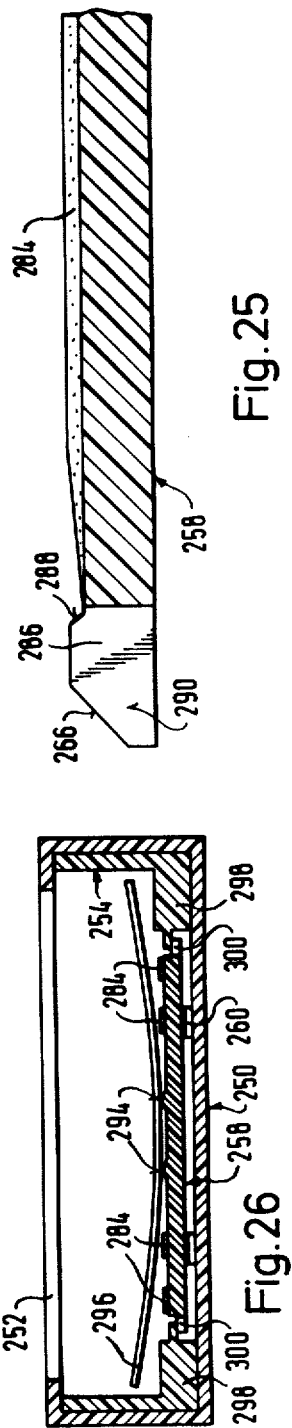

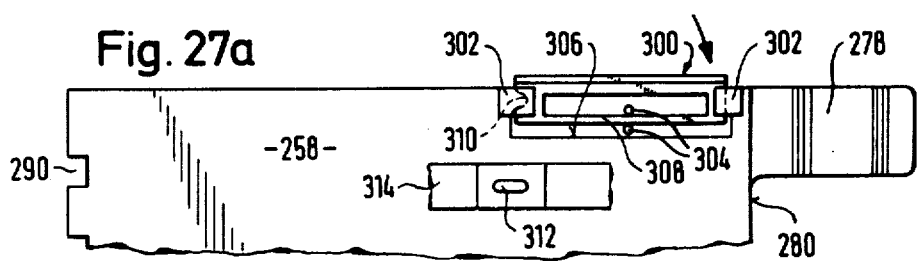
Fig. 27a
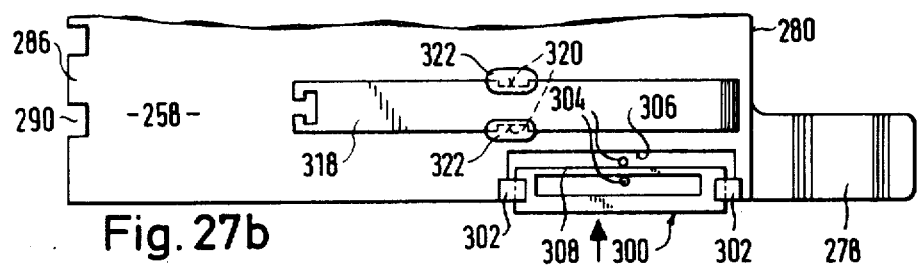
Fig. 27b
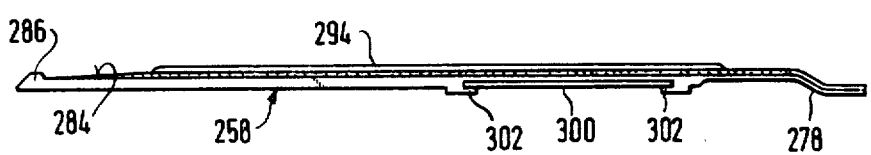
Fig. 28
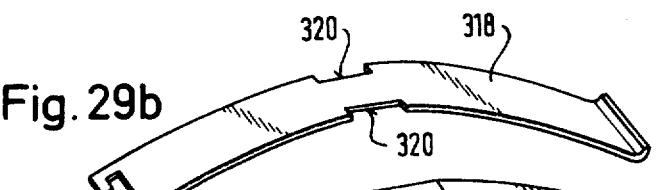
Fig. 29b
Fig. 29a
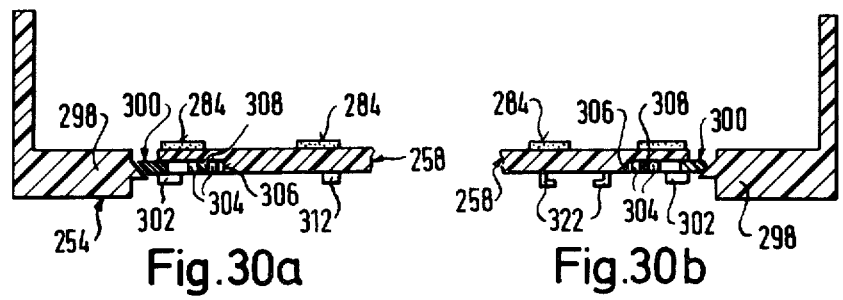
Fig. 30a        Fig. 30b

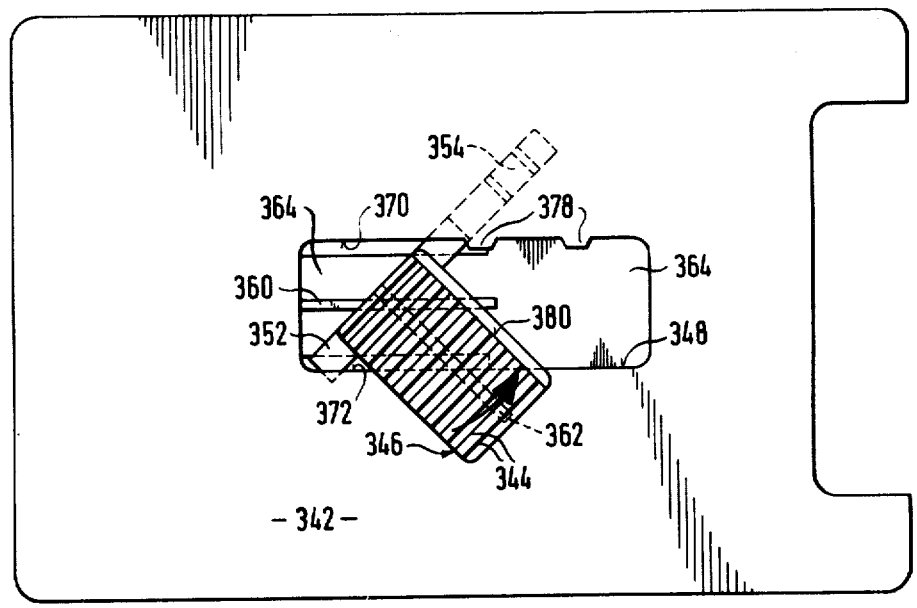

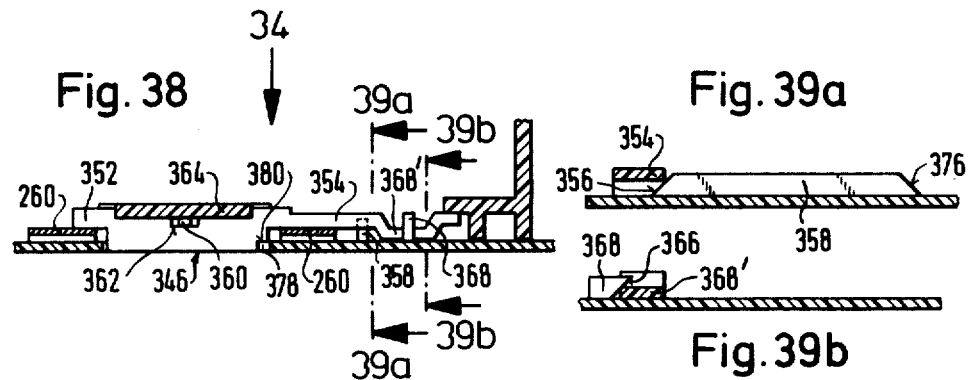
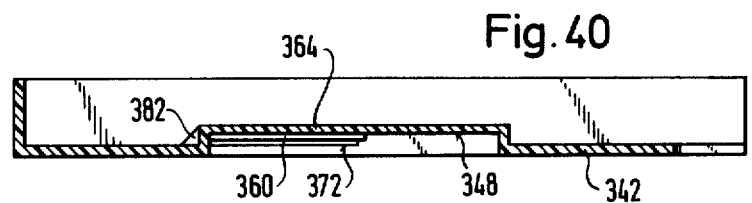
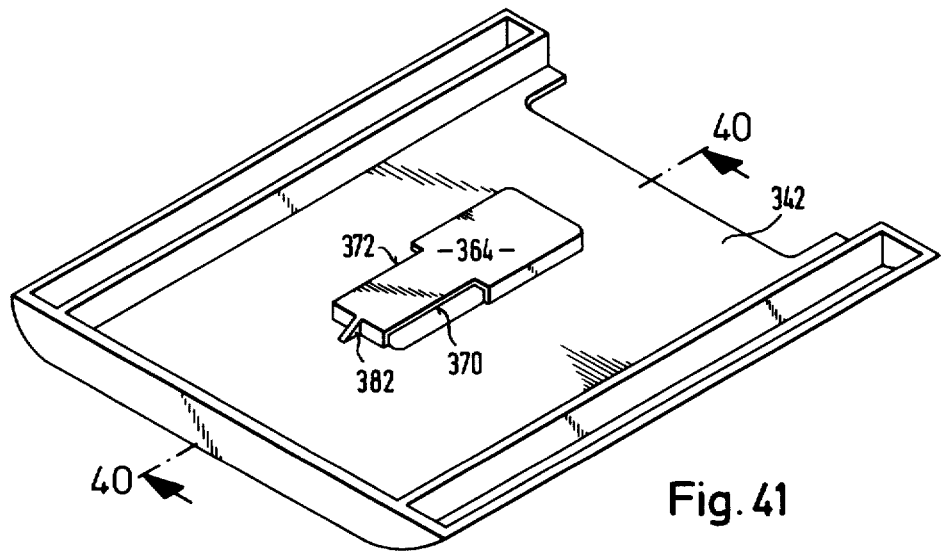

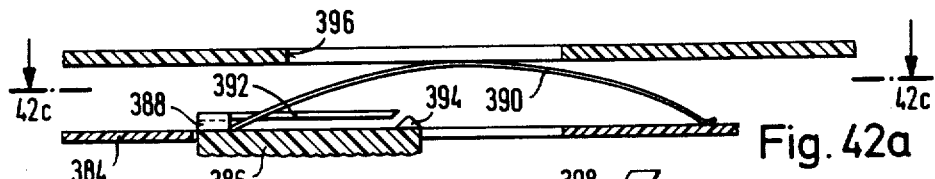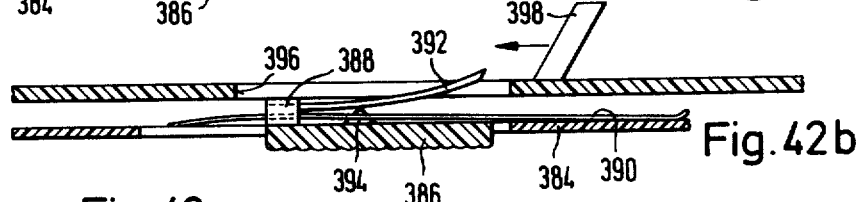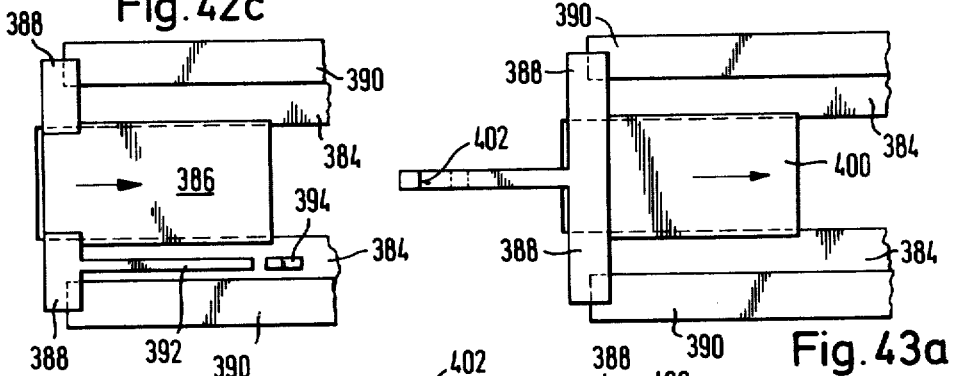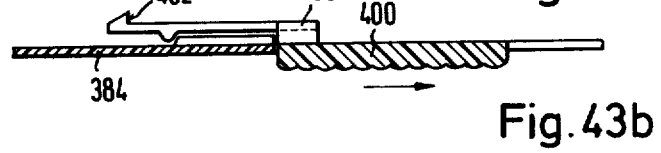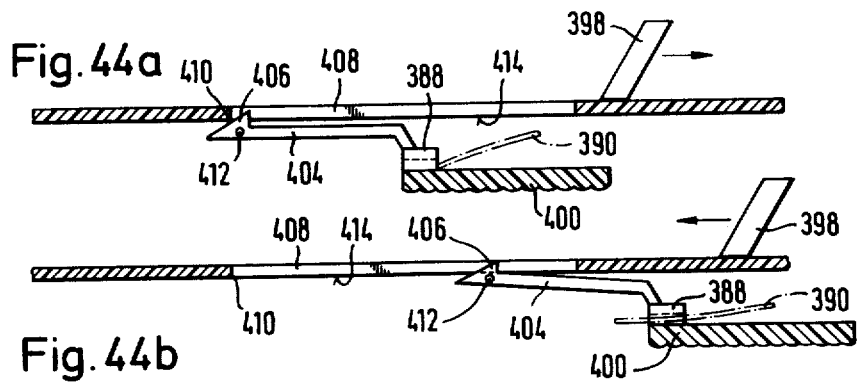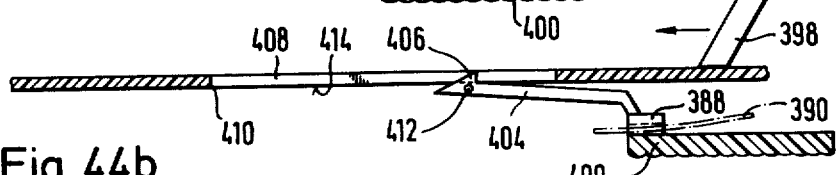

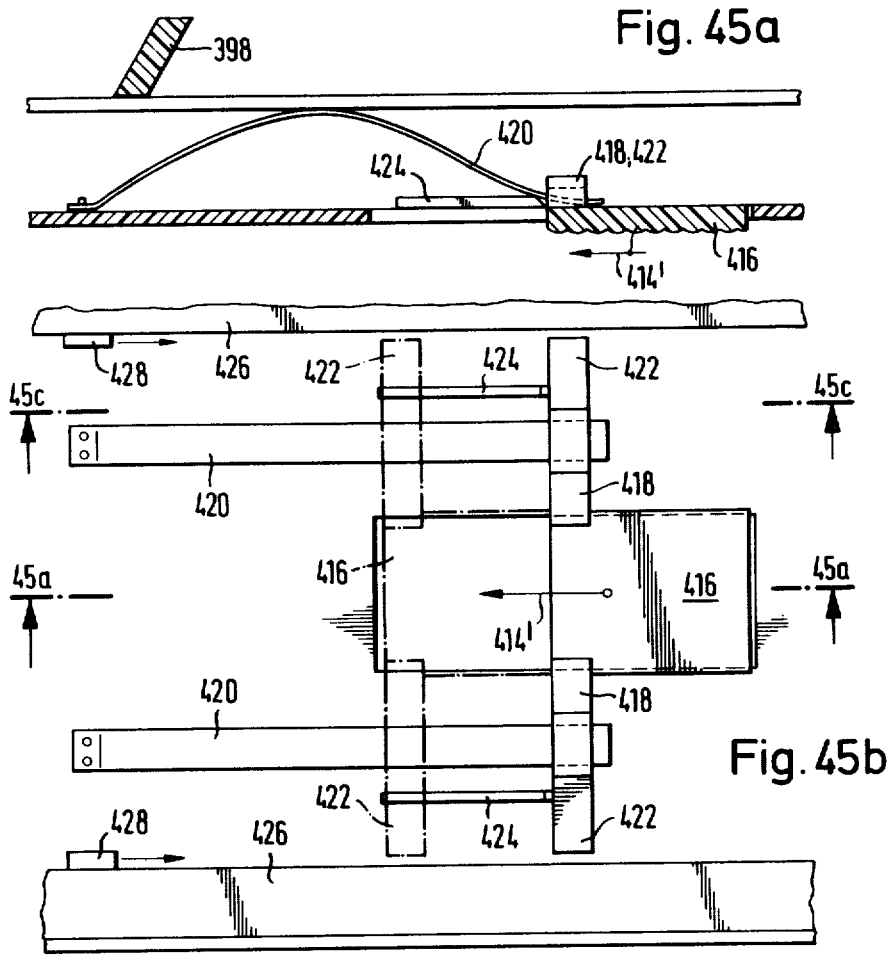
Fig. 45a
Fig. 45b
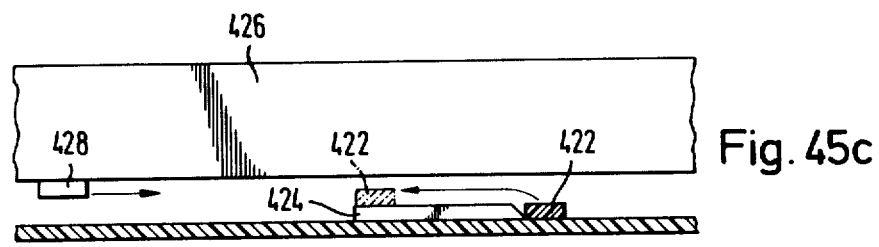
Fig. 45c

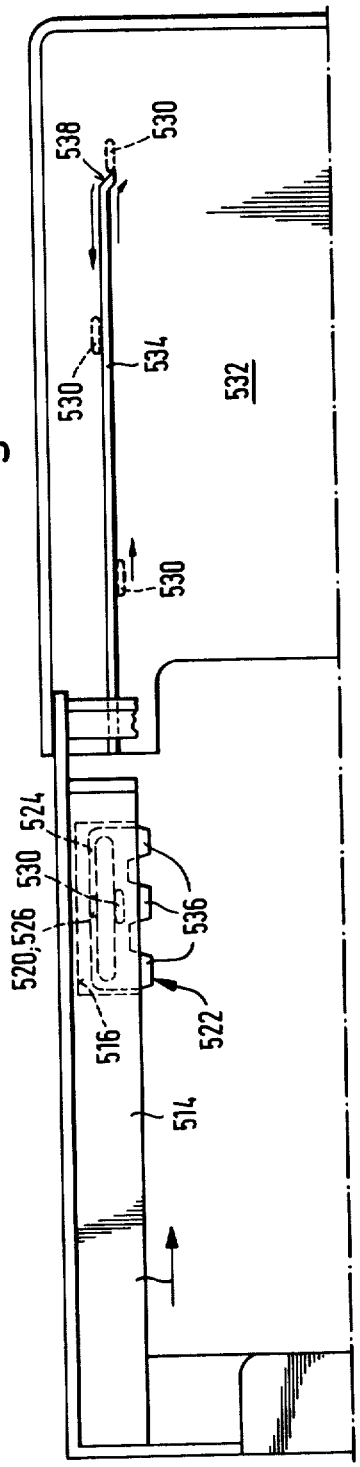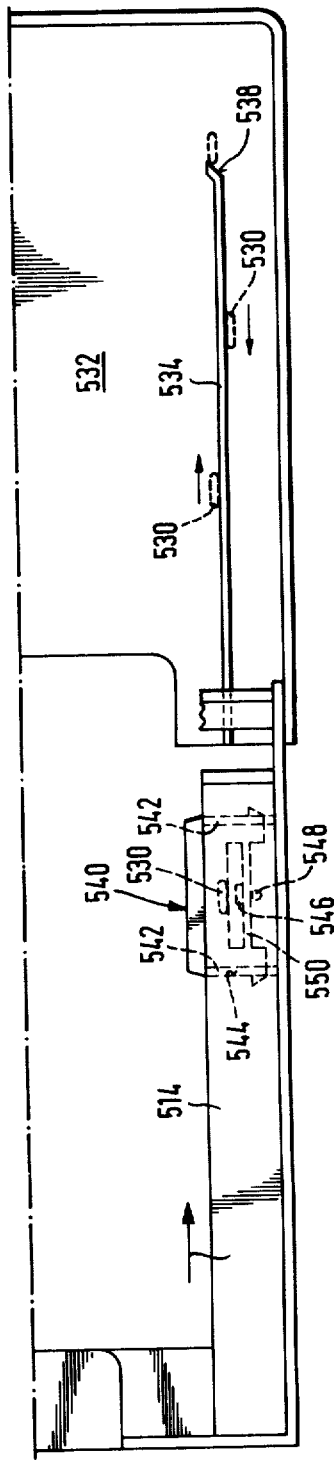

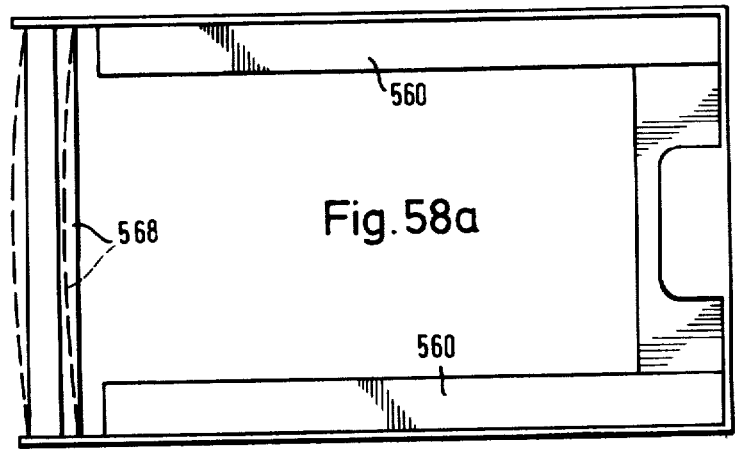
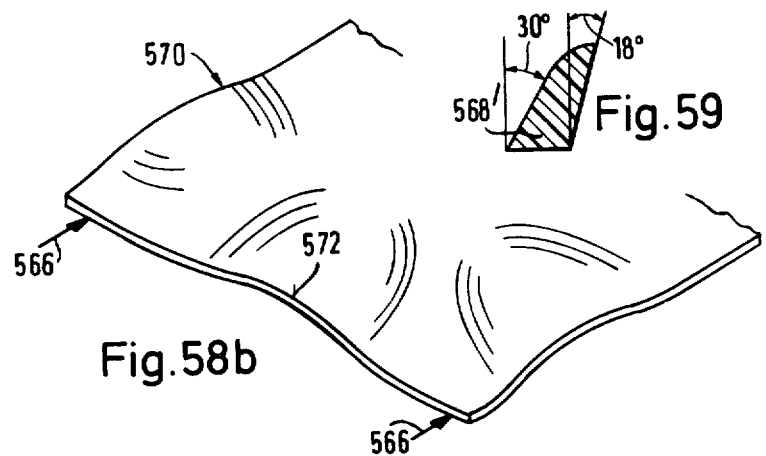
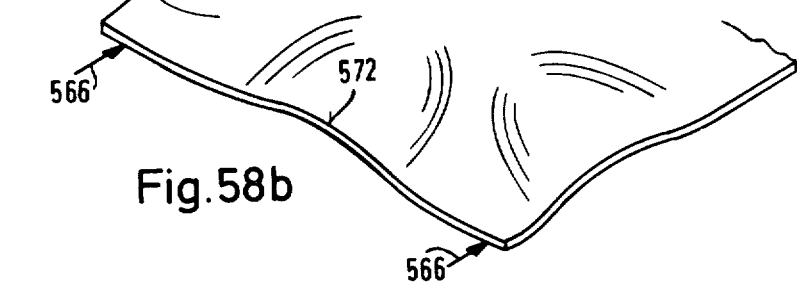
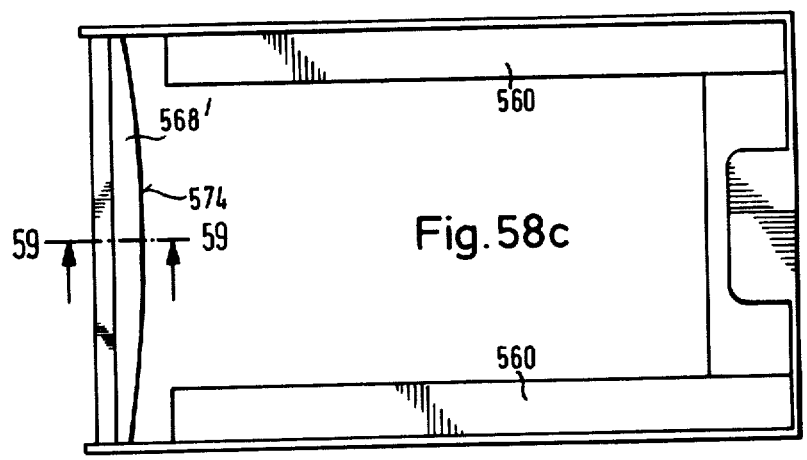

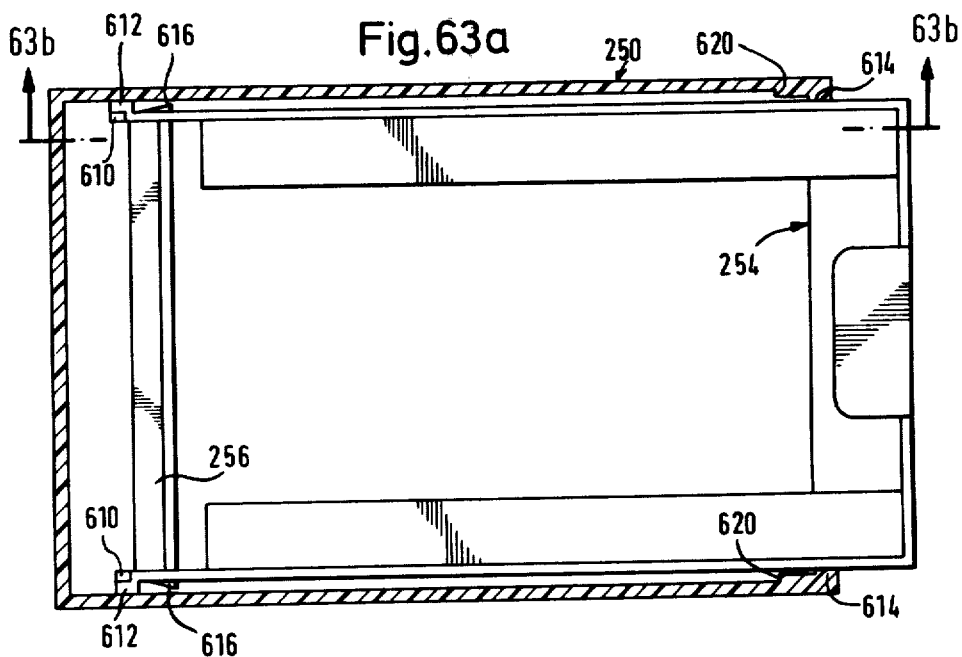
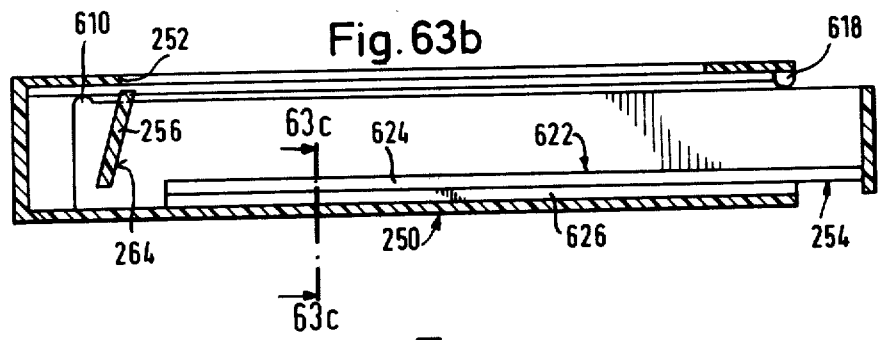
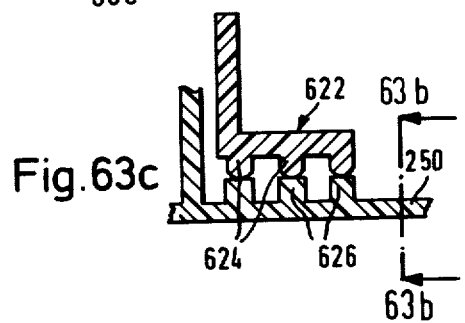

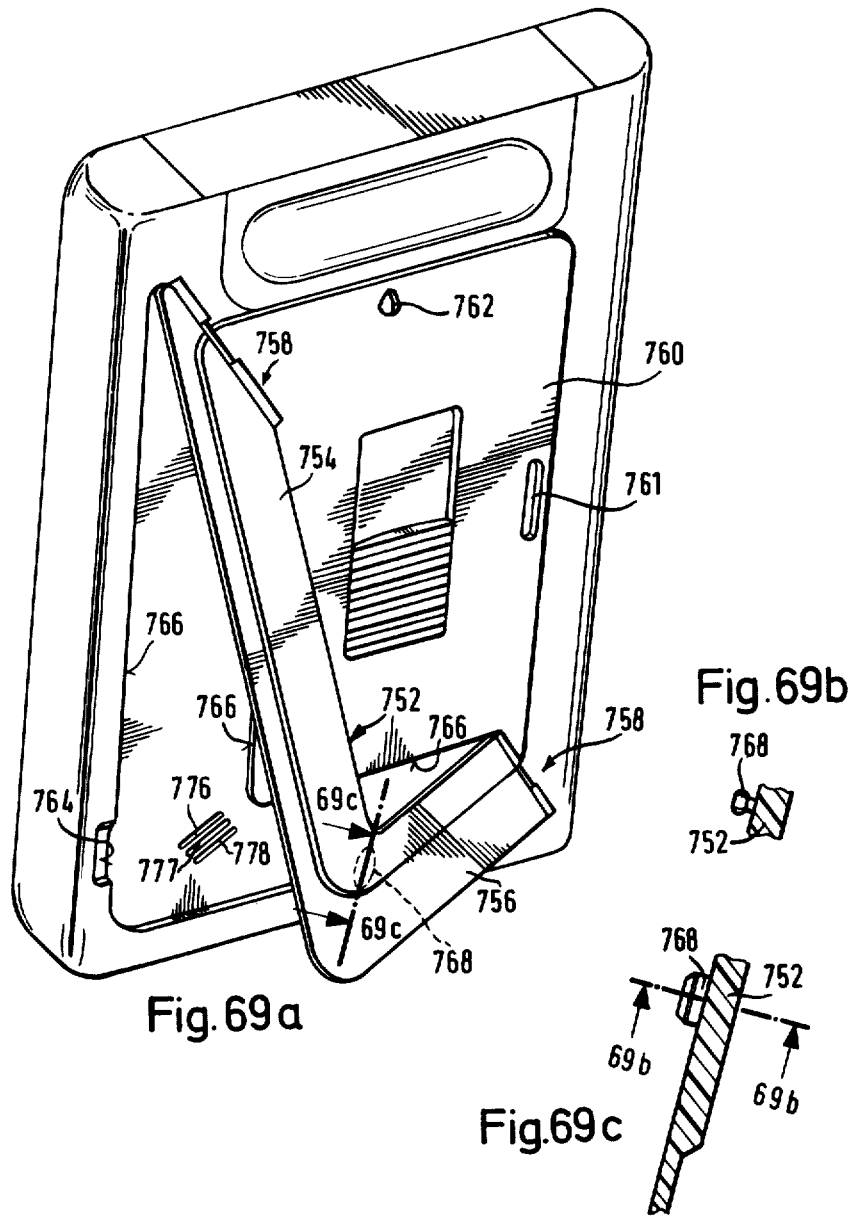

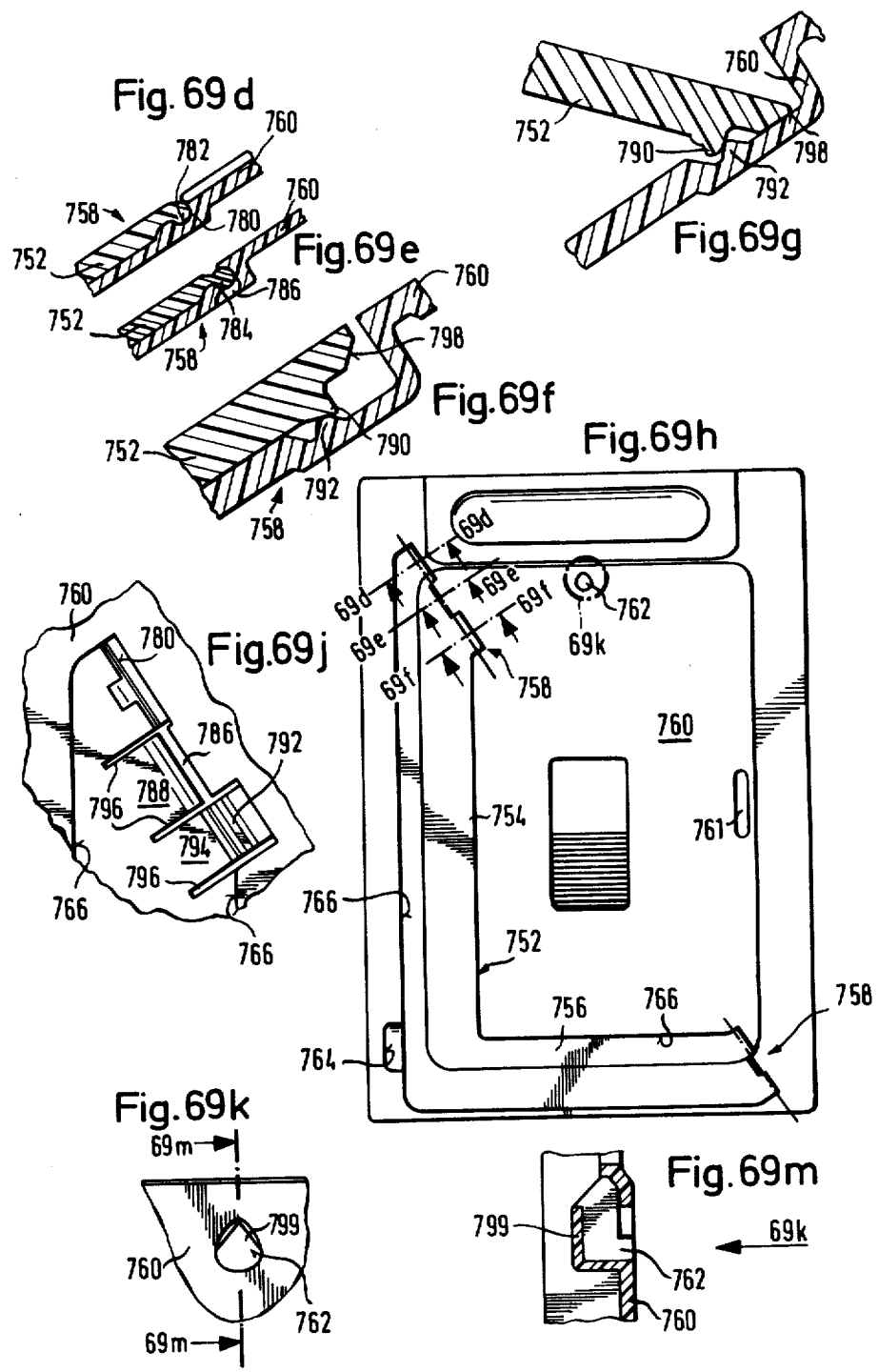

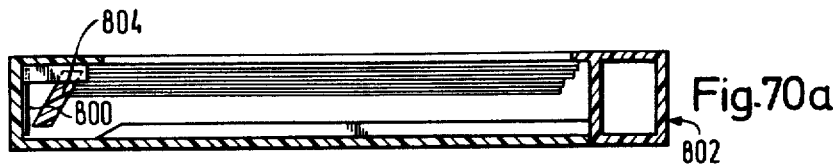
Fig. 70a
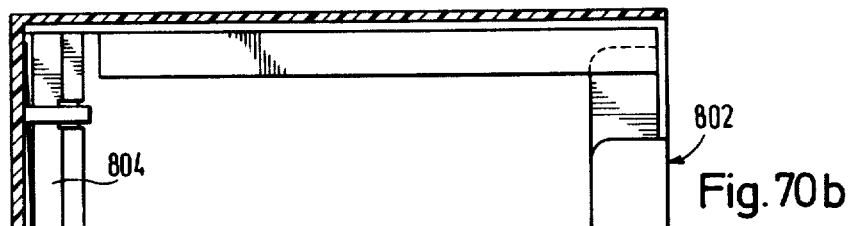
Fig. 70b
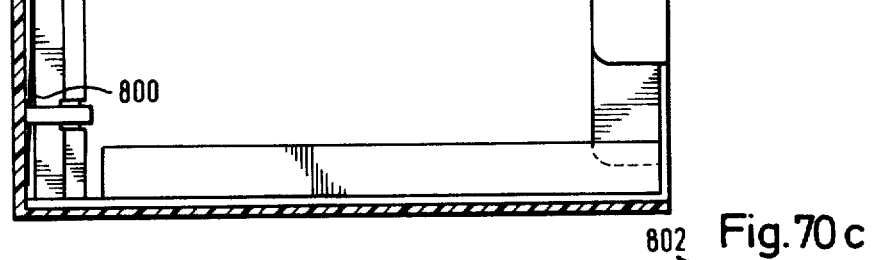
Fig. 70c
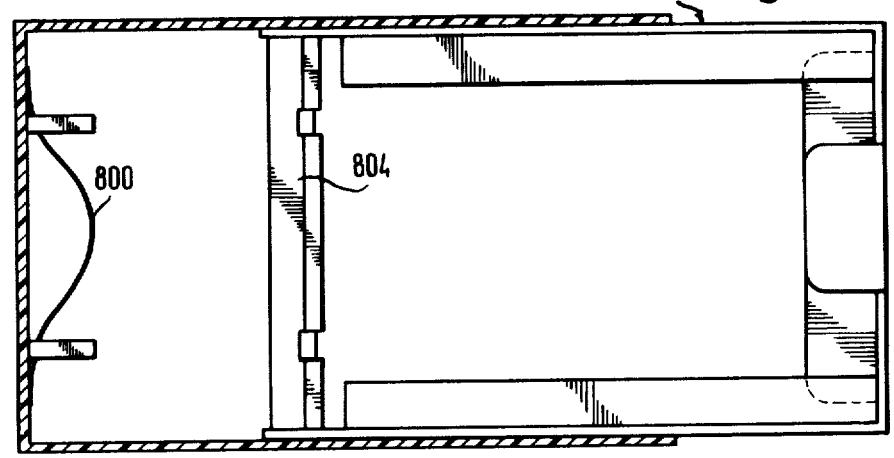

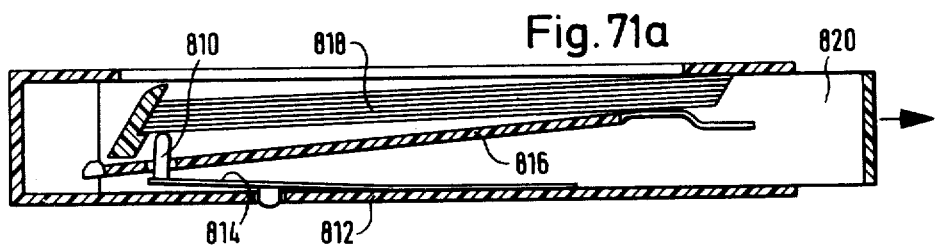
Fig. 71a
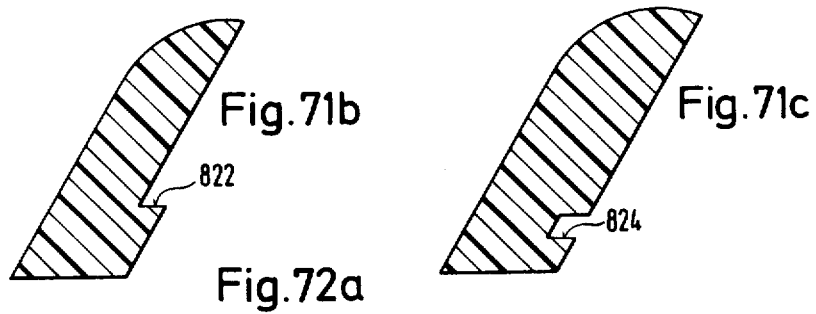
Fig. 71b  Fig. 71c
Fig. 72a
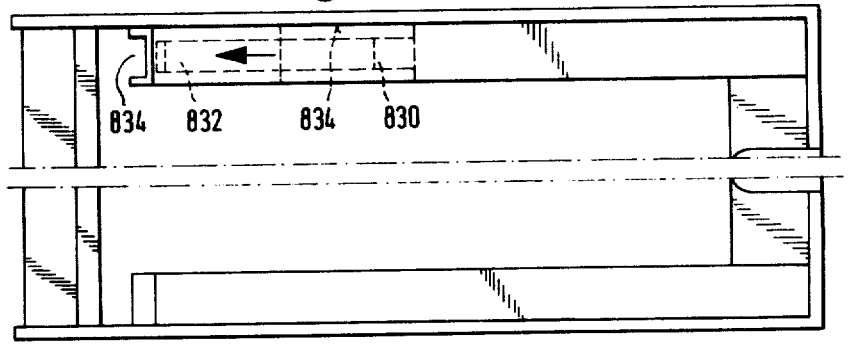
Fig. 72b
Fig. 72c
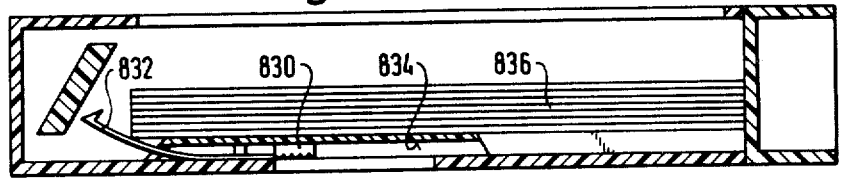

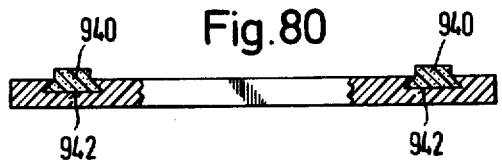
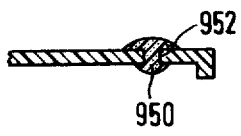
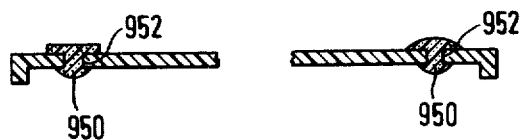
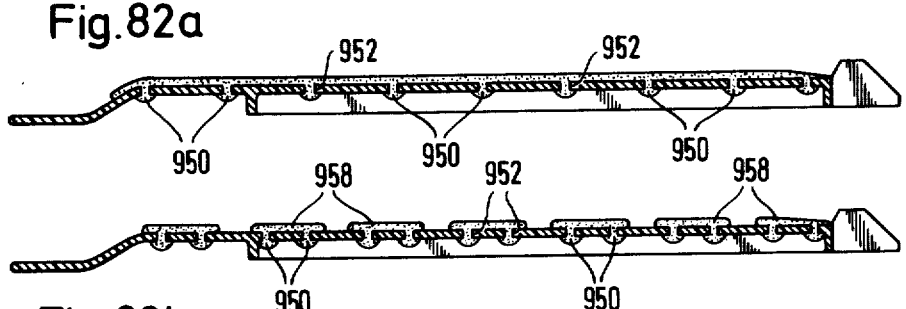
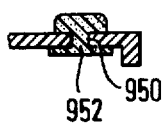
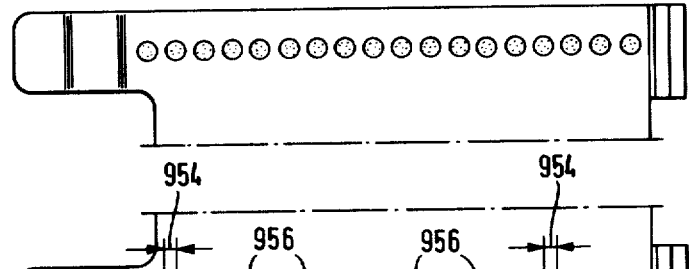

PICTURE VIEWER

This invention relates to a picture viewing device having a housing for accommodating a pile of pictures, of which the uppermost picture lies beneath a housing window, having a slider member that may be pulled out of the housing and reinserted parallel to the viewing window, and having a picture change mechanism consisting of a transporter, by means of which a picture can be removed from one side of the pile as the slider member is withdrawn and is guided to the other side of the pile again as the slider member is pushed in, and of a retaining device preventing the remainder of the pile from being transported, and having an externally operable device for disabling the picture change mechanism for the removal of the entire pile out of the housing by means of the slider member, the retaining device being provided in the form of a separator on the slider member and the transporter being provided in the form of retentive elements on an arrangement located in the housing under spring bias. Such devices are described and claimed in our earlier German patent application No. P27 42 349 now published as an Offenlegungsschrift. British patent application No. 37449/78 published as Specification No. 2005227 corresponds to German patent application No. P27 42 349.

The devices described in German Offenlegungsschrift No. 27 42 349 have the advantage that the whole pile can be removed by means of the slider member when the change mechanism is disabled. This makes it possible to manufacture a picture changer device which is convenient to handle and good value for money.

The devices described in specification No. P27 42 349 comprise a pressing arrangement in the form of one or several springs with an externally operable button provided on the base of the housing for rendering the springs inoperative. These devices form the basis of the present invention which is based on the problem of improving the devices described and claimed in No. P27 42 349 in the manner described in detail below:

In addition to its function as a viewing device which can easily be held in the hand, it is desirable that the device should also be capable of being used as a stand-up or hanging frame. This means that the front of the device has to have an aesthetically pleasing exterior and the back has to be provided with a supporting foot by means of which the device can be stood upright or on its side; desirably it should also be possible to insert the device in the correct position both into a storage shelf and into an automatic picture change apparatus, it being especially important for the device to operate reliably even in the case of deformed pictures. The device should nevertheless be cheap to manufacture.

The present invention provides a picture viewing device having a housing for accommodating a pile of pictures, of which the uppermost picture lies beneath a housing window having a slider member that may be pulled out of the housing and reinserted parallel to the viewing window and having a picture change mechanism consisting of a transporter by means of which a picture can be removed from one side of the pile as the slider member is withdrawn and is guided to the other side of the pile again as the slider member is pushed in and of a retaining device preventing the remainder of the pile from being transported and having an externally operable device for disabling the picture change mechanism for the removal of the entire pile out of the housing by means of the slider member the retaining device being provided in the form of a separator on the slider member and the transporter being provided in the form of retentive elements on an arrangement located in the housing under spring bias, wherein the pressure arrangement comprises a plate supported by springs the plate being of dimensions substantially corresponding to the size of the pictures, and on which the retentive elements are arranged.

The use of a pressure plate made of plastics material in conjunction with metal springs allows inexpensive manufacture since the expensive spring materials are used only where really constant resilience is required. Secondly, the construction of the pressure plate from plastics material makes it easier and therefore cheaper, to apply a retentive covering which, moreover can be so arranged that even extremely deformed pictures, that is to say pictures that curve downwards, can always be gripped reliably. Furthermore, the plate can cover the springs and the disabling mechanism so that on looking into an empty device only the preferably matt-black surface of the plate can be seen.

The plate can be rigid enough to be able to allow the disabling device to engage the plate. As a result, greater choice is provided for the type, arrangement and accommodation of the externally operable element and, consequently, for example, a button which effects the disablement can be disposed at the edge of the housing thus leaving space at the centre of rear side of the housing in which to accommodate a stand.

Since all the technical parts of the device are then arranged in the interior or on the rear side of the housing, the housing can be manufactured in two parts in such a manner that the front side is constructed as a decorative frame having, if desired, a different finish, whilst the other parts remain uniformly the same. This two-part construction in turn makes it possible to fit advantageously the guide and stop means necessary for inserting the device into an automatic picture change apparatus.

Figure 31B:
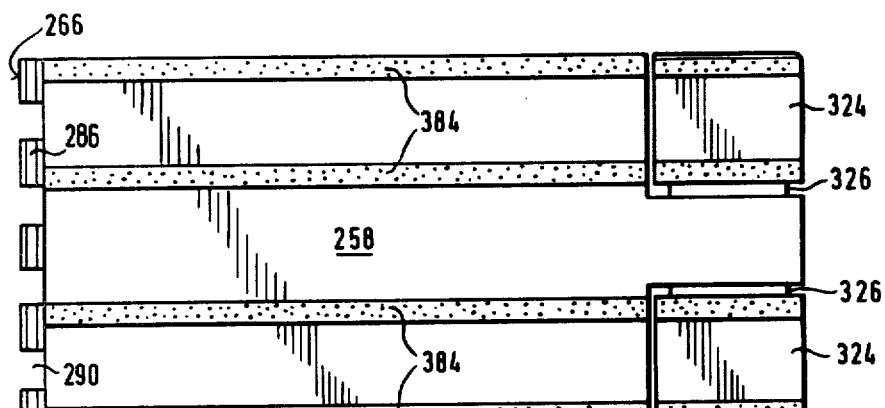
Figure 31C:
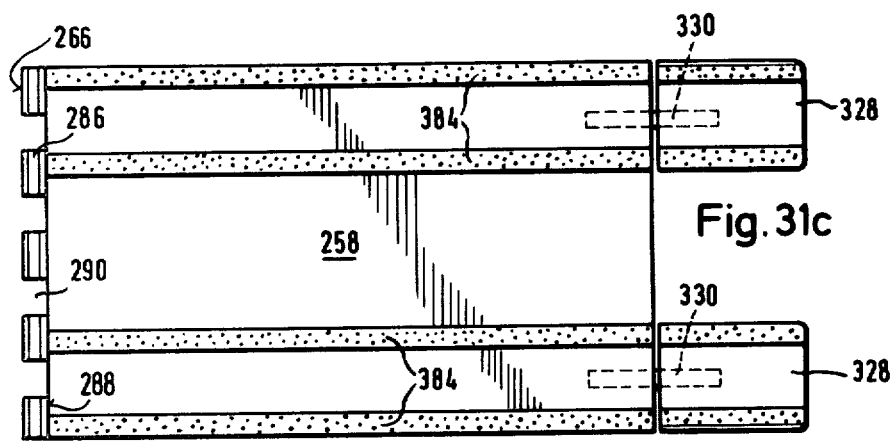
Figure 32A:
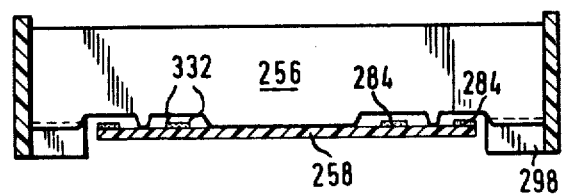
Figure 32B:
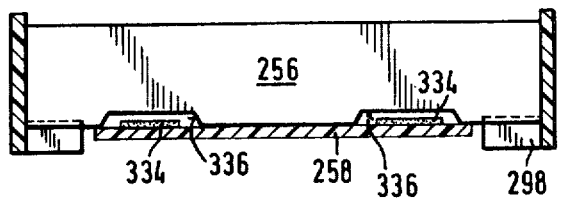
Figure 32C:
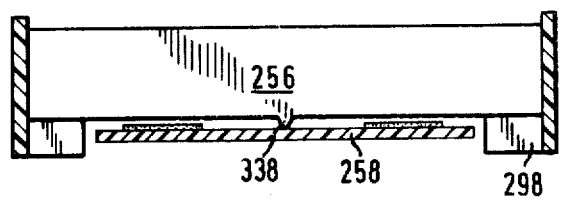
Figure 32D:
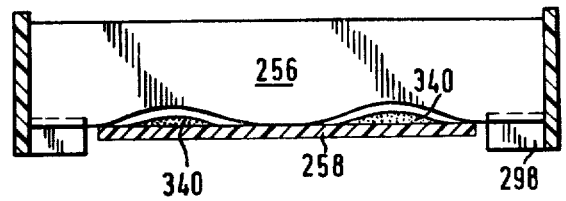
Figure 33:
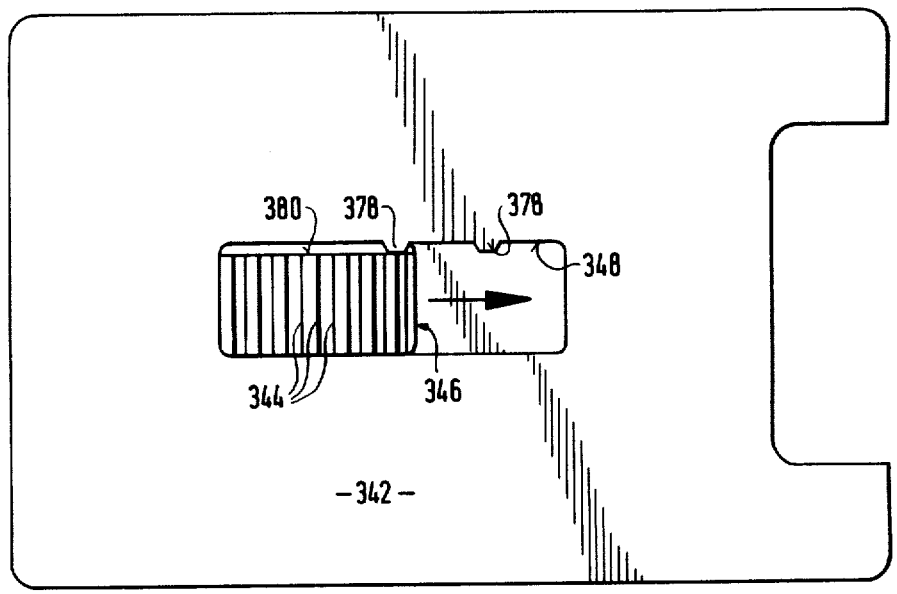
Figure 34:
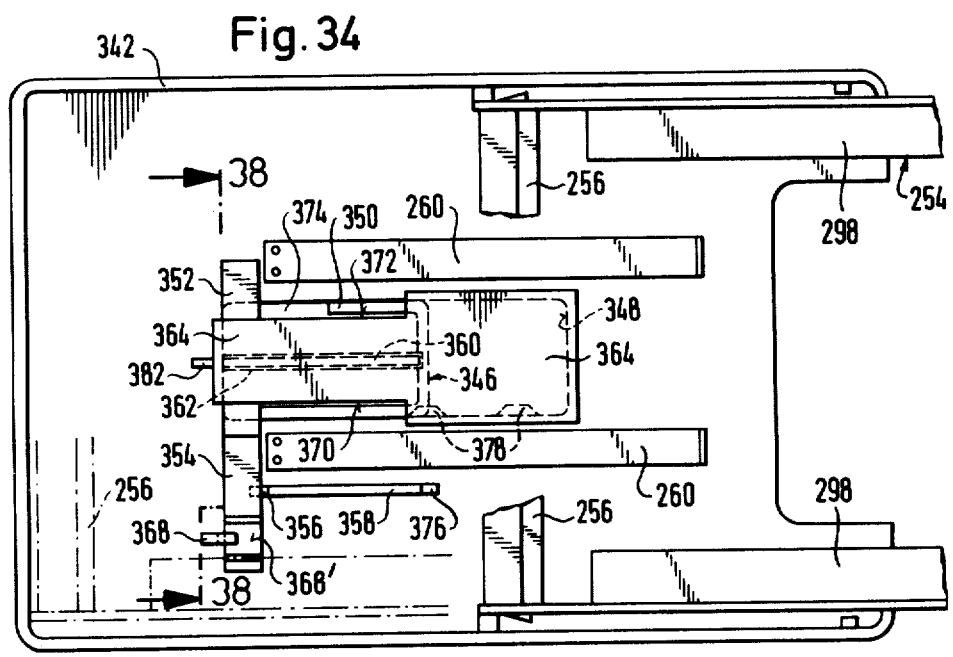
Figure 46:
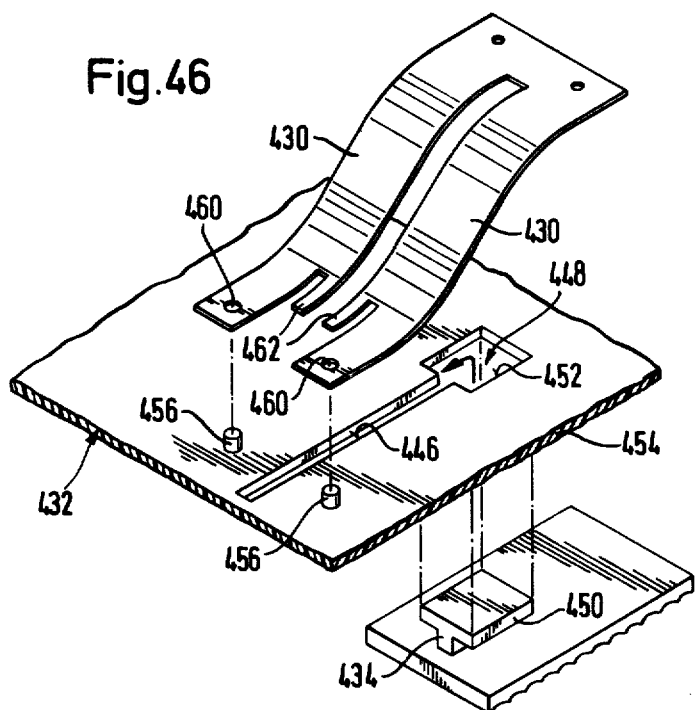
Figure 47A:
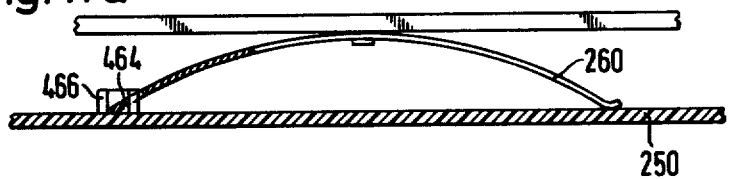
Figure 47B:
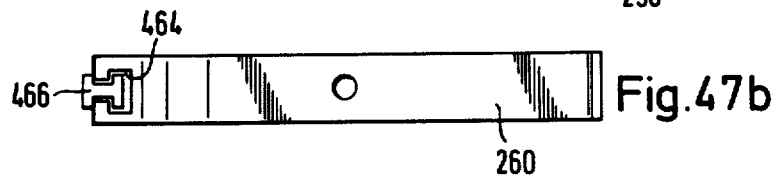
Figure 48B:
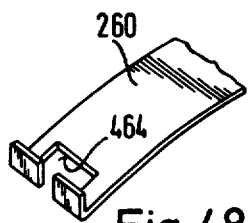
Figure 48A:
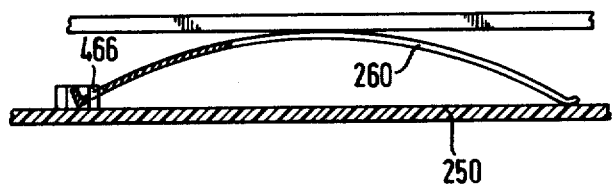
Figure 49A:
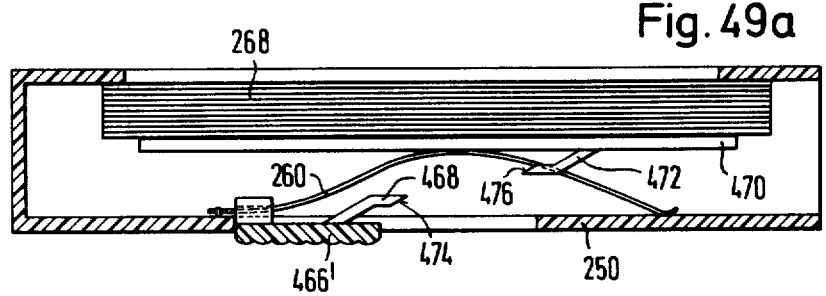
Figure 49B:
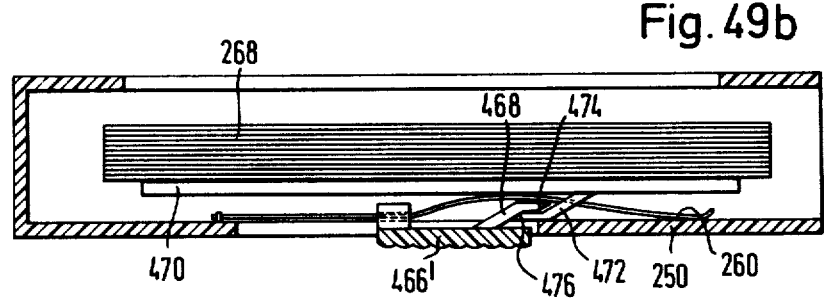
Figure 50A:
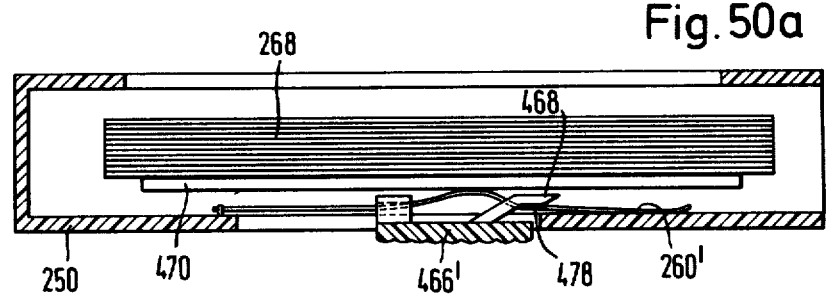
Figure 50B:
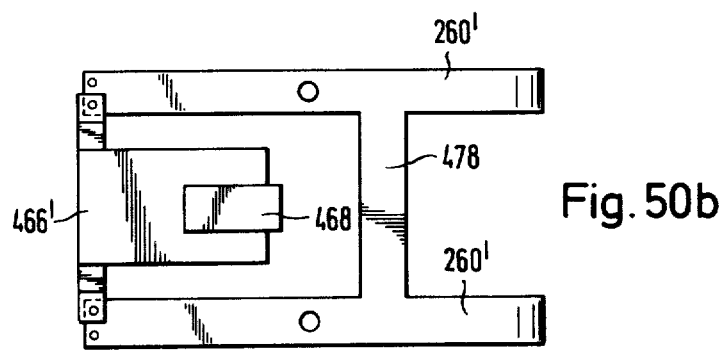
Figure 51:
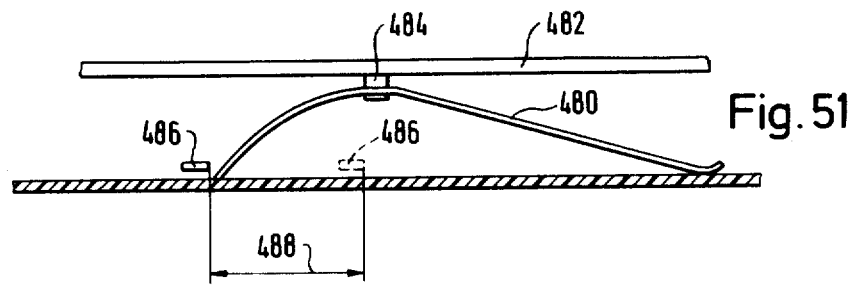
Figure 52:
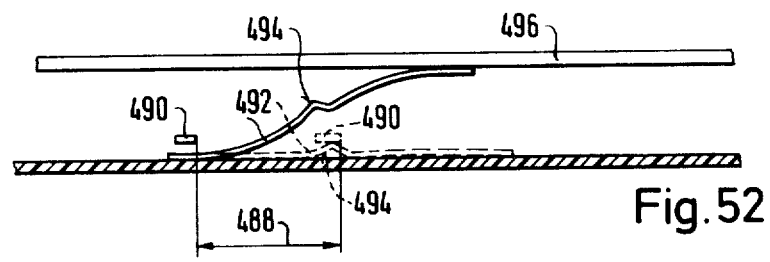
Figure 53:
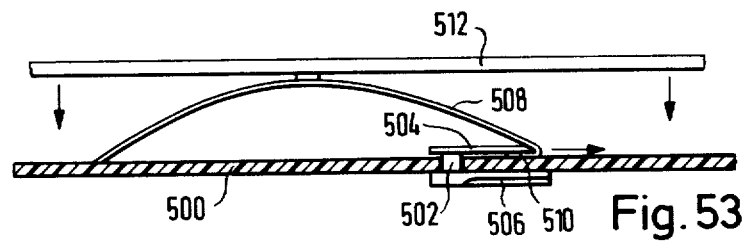
Figure 54:
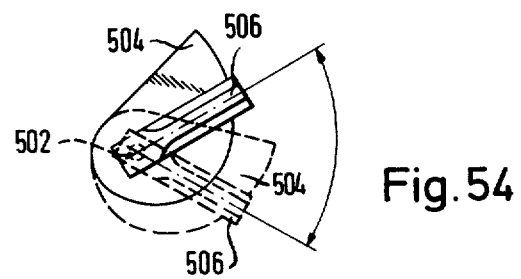
Figure 56A:
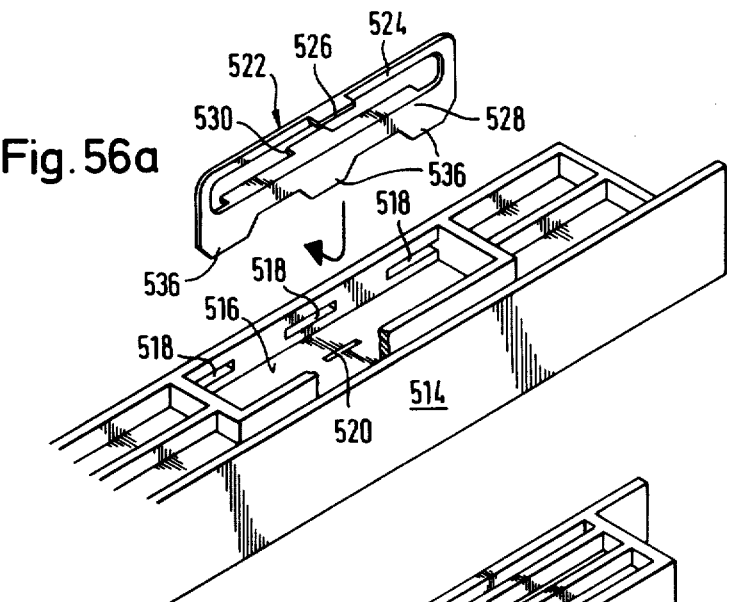
Figure 56B:
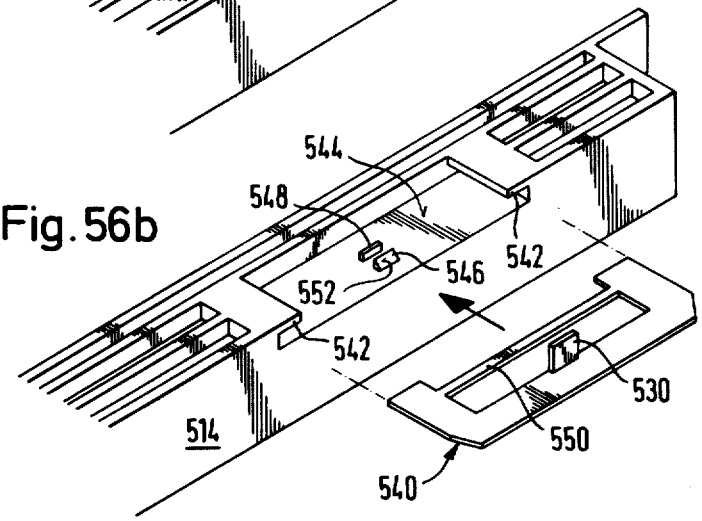
Figure 57:
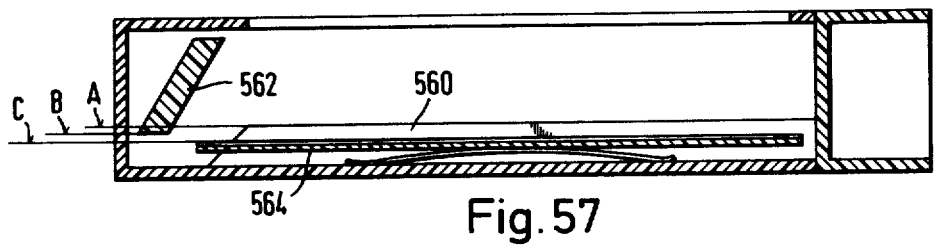
Figure 60:
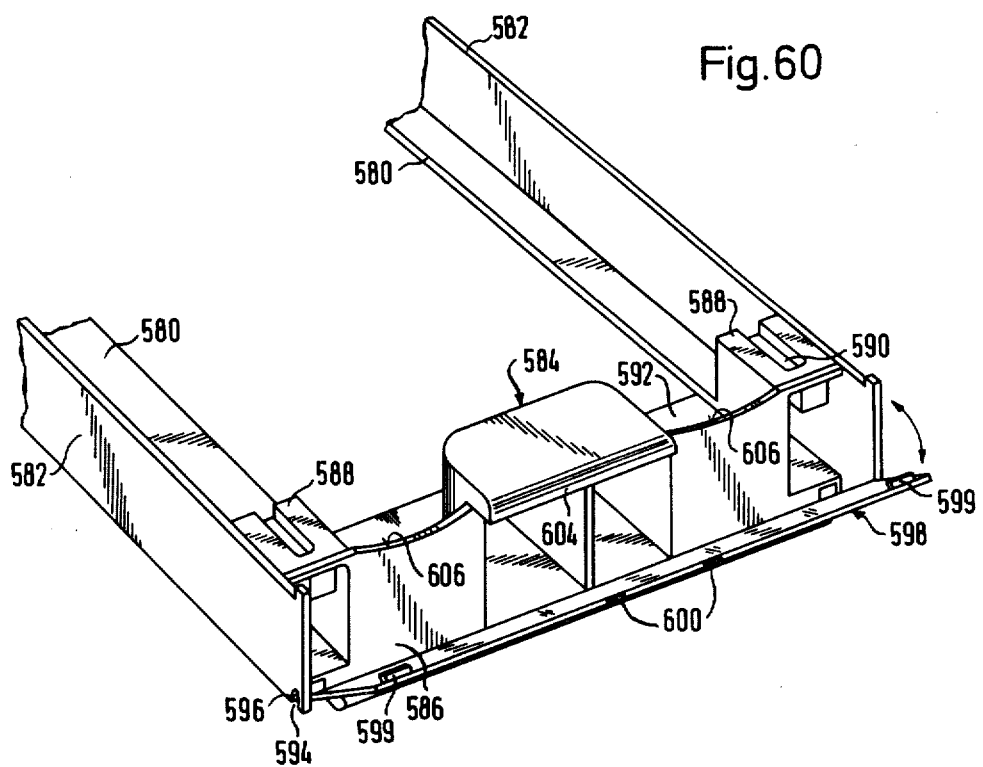
Figure 61:
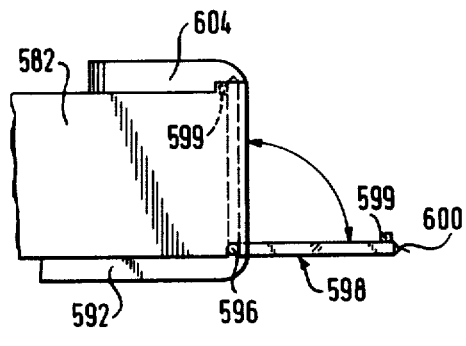
Figure 62:
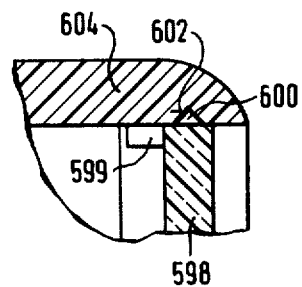
Figure 64A:
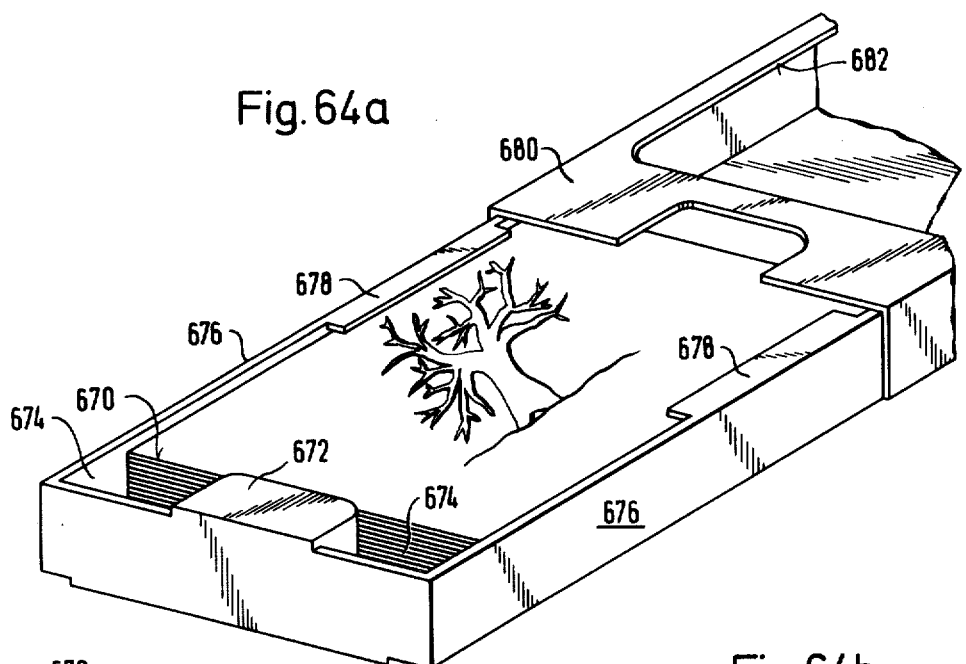
Figure 64B:
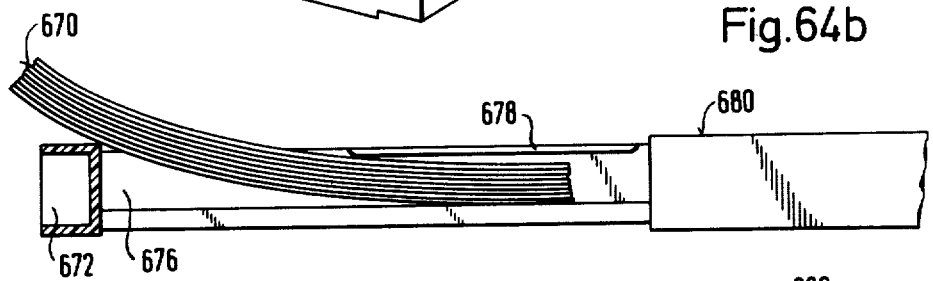
Figure 64C:
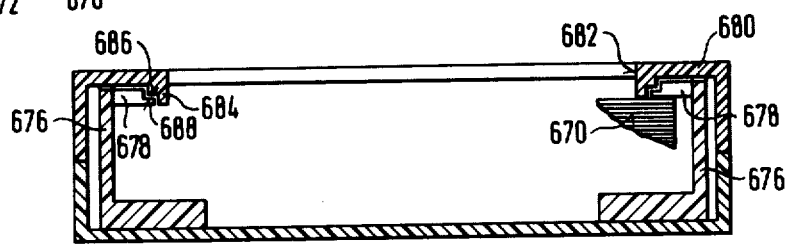
Figure 65A:
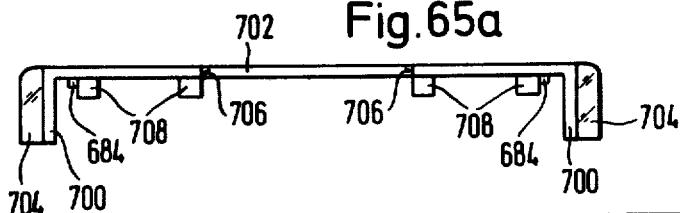
Figure 65B:
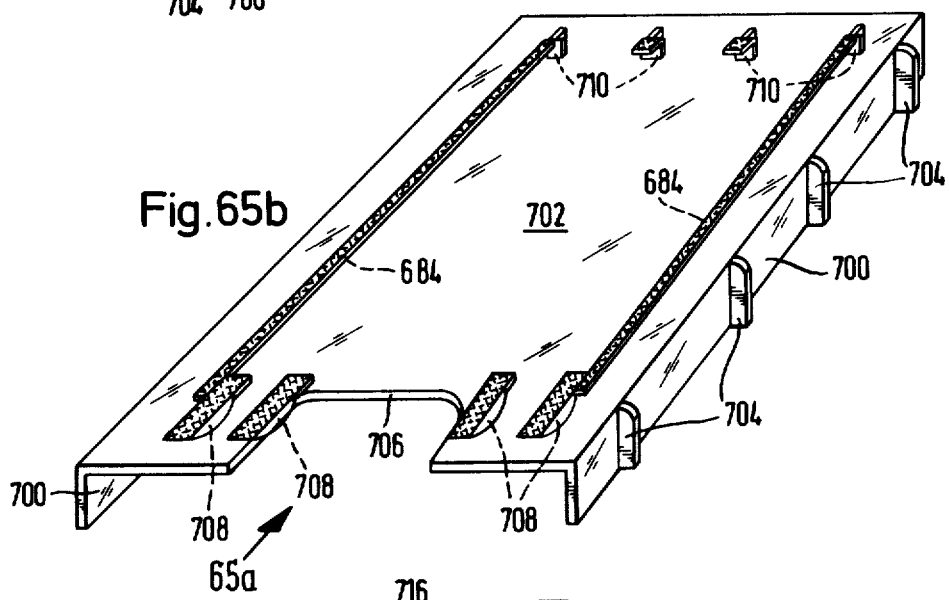
Figure 66:
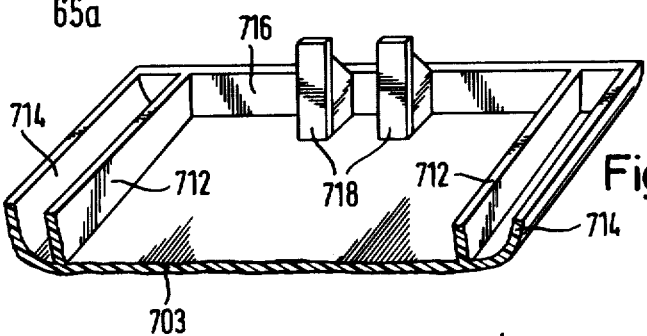
Figure 67:
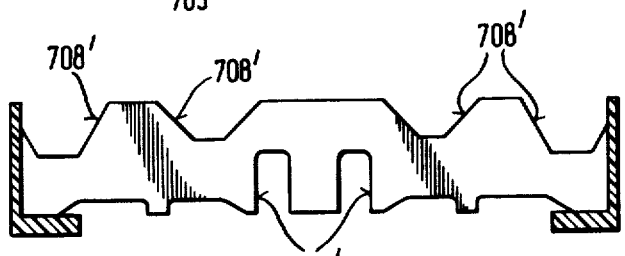
Figure 73A:
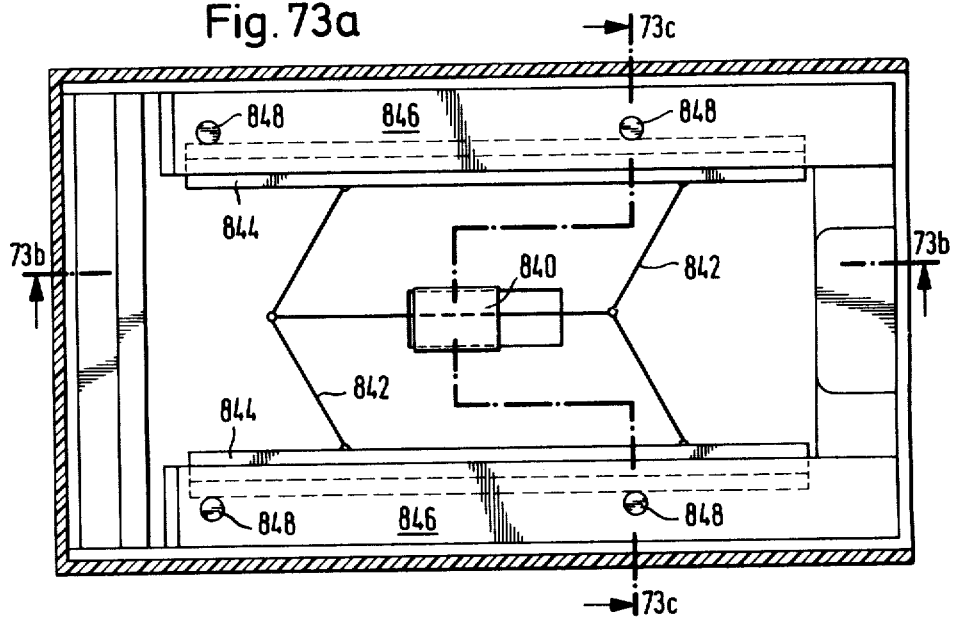
Figure 73B:
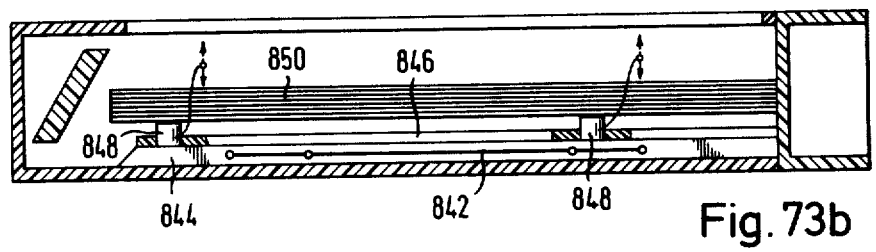
Figure 73C:
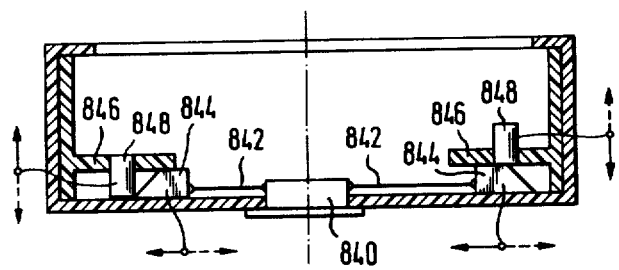
Figure 74:
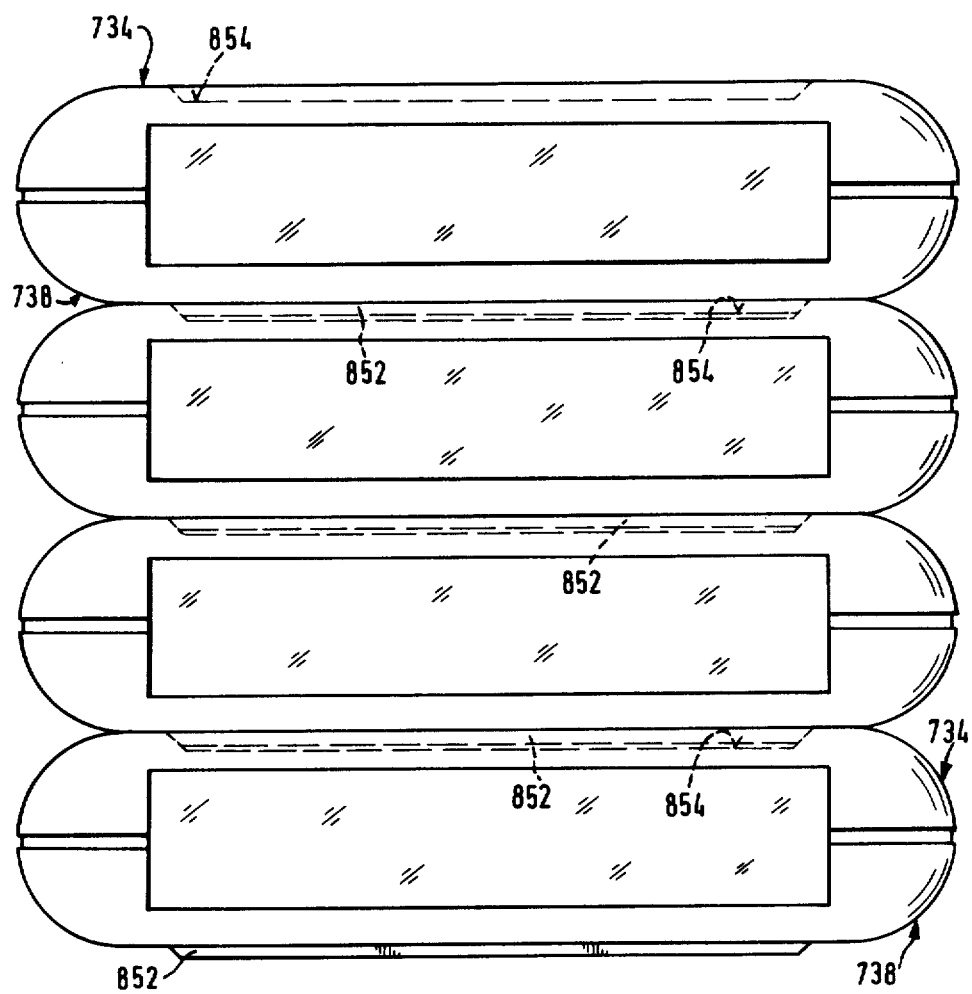
Figure 75A:
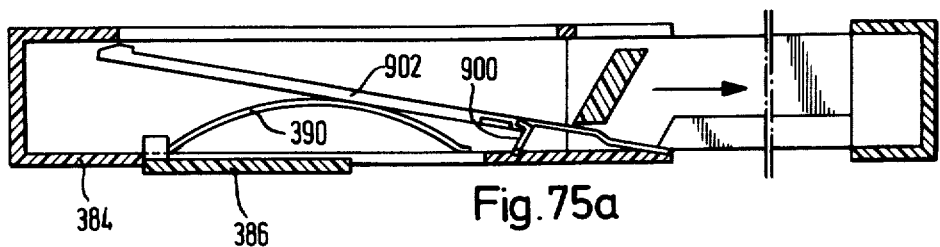
Figure 75B:
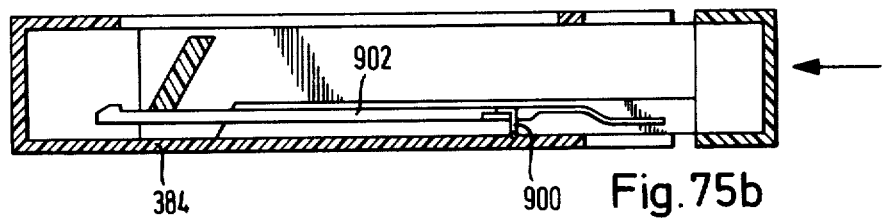
Figure 75C:
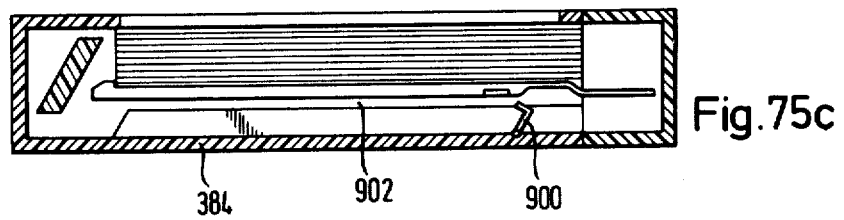
Figure 76:
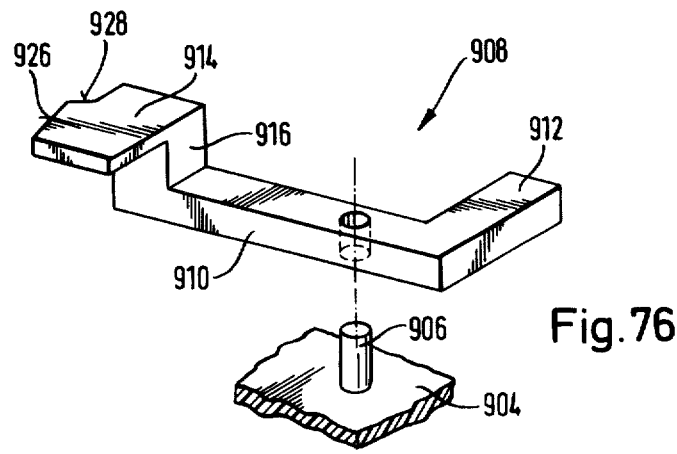

By way of example only, certain illustrative embodiments of the invention will now be described with reference to the accompanying drawings, in which:

FIG. 1 is a perspective view of a picture viewing device embodying the invention, FIG. 2 shows in perspective details of a slider member used in the device shown in FIG. 1, FIG. 3 is a section along the line 3—3 of FIG. 2, FIG. 4 is a schematic longitudinal section through the device shown empty, FIG. 5 is a plan view from the inside looking onto a lower shell of a housing of the device, FIG. 6 is a cross-section through the housing but omitting a pressure arrangement, FIG. 7 shows in perspective a disablement mechanism, FIG. 8 shows a pressure plate from below, FIG. 9 shows the pressure plate in cross-section with a separator in the slider member also being shown, FIG. 10 shows the pressure plate from above in perspective, FIG. 11 is a highly enlarged view in perspective of a piece of a transporter constructed as a retentive element, FIG. 12 is a section along the line 12—12 of FIG. 10, FIG. 13 shows schematically a device for cleaning the transporter in the inoperative position and FIG. 14 is similar to FIG. 13 but relates to the operative position, FIG. 15 shows the housing from behind, FIG. 16 is a section along the line 16—16 of FIG. 15, FIG. 17 is a section along the line 17—17 of FIG. 15, FIG. 18 shows a side view of the device used as a stand-up frame, FIG. 19 shows a side view of the disabled device, FIG. 20 shows a disabling button pulled out, FIG. 21 shows a rear view of three examples of the device of different format, and FIG. 22 shows other examples, in a similar manner to FIG. 21, FIGS. 23a to 23d show schematically, in longitudinal section, another device embodying the invention, FIG. 24 shows in perspective a plastics plate used in the device shown in FIG. 23, FIG. 25 is a section along the line 25—25 of FIG. 24, FIG. 26 is a cross-section along the line 26—26 through the device shown in FIG. 23d, FIGS. 27a and 27b are plan views from below onto the plastics plate shown in FIG. 24 of two alternative shapes of runners shown only schematically in FIG. 24, FIG. 28 is a side view of the construction shown in FIG. 27b, FIG. 29a shows in perspective springs to be attached to the plate shown in FIG. 27a, FIG. 29b shows in a similar manner to FIG. 29a the spring belonging to FIG. 27b, FIGS. 30a and 30b show two alternative cross-sections for the runners shown in FIGS. 27a and 27b, FIGS. 31a to 31c are a schematic plan view of alternative shapes for the plastics pressure plate, FIGS. 32a to 32d show four schematic cross-sections of picture change devices having alternative arrangements of transporter retentive covering FIG. 33 shows the construction of a disabling button, looking from below onto a picture change device, FIG. 34 shows the FIG. 33 construction, viewed from the inside onto the base of the housing, with the change slider member pulled halfway, FIG. 35 serves to explain the assembly of the device shown in FIG. 33, 34, FIG. 36 is an interior view of the disabling button, FIG. 37 is a section along the line 37—37 of FIG. 36, FIG. 38 is a section along the line 38—38 of FIG. 34, FIGS. 39a and 39b are representations of the views marked 38 with this section denotation, FIG. 40 is a section along the line 40—40 in FIG. 41, FIG. 41 shows in perspective, from the inside the base part of the housing of the device shown in FIGS. 33–40 but without the button inserted, FIG. 42a is a schematic longitudinal section of an alternative form of disabling key, FIG. 42b shows the construction shown in FIG. 42a in the disabling position of the button, FIG. 42c is a plan view of the arrangement of the elements shown in FIG. 42a, FIG. 43a is a representation similar to FIG. 42c of a further alternative, FIG. 43b is a schematic longitudinal section through corresponding operating elements, FIG. 44a and 44b show in longitudinal section similar to FIG. 42a and 42b, respectively, a further variation, FIG. 45a shows in a similar manner to FIG. 42a a further embodiment of the invention, FIG. 45b is a plan view corresponding to FIG. 45a, FIG. 45c is a schematic longitudinal section, laterally displaced with respect to FIG. 45a, of the control elements of the disabling button, FIG. 46 is a perspective, but schematic view of an alternative to the construction according to FIG. 35 for the assembly of a disabling button, FIGS. 47a and 47b show in longitudinal section and in plan view, respectively, the connection of the pressure spring to the housing of the device, FIG. 48a shows in an analogous manner to FIG. 47a an alternative construction, FIG. 48b shows in perspective the shape of the spring at the support end, FIG. 49a is a schematic longitudinal section through a further form of a disabling button, FIG. 49b is a representation analogous to FIG. 49a in the disabling position of the button, FIG. 50a is a representation similar to FIG. 49a in a modified construction, FIG. 50b shows in schematic plan view the associated contours of spring and button, FIG. 51 is a schematic longitudinal section through a disabling device with a spring contour which is especially suitable therefor, FIGS. 52 and 53 shows in an analogous manner to FIG. 51 further possible constructions, FIG. 54 is a view in the direction of the arrow 54 in FIG. 53, FIGS. 55a and 55b show in schematic plan view alternative embodiments of the "runners" shown in FIG. 27a or 27b, FIGS. 56a and 56b show in perspective and also enlarged with respect to FIG. 55a and 55b, respectively, the assembly and attachment of the runners, FIG. 57 shows schematically, in longitudinal section, the three different levels, respectively defined by the slider member ledges, the lower edge of the separator and the upper side of the transporter-retentive coverings; this drawing applies to virtually all of the embodiments discussed above, FIGS. 58a to 58c serve to illustrate a particular construction of the separator, FIG. 59 is a section through the separator along the line 59—59 of FIG. 58c, FIG. 60 shows in perspective the guiding end of the slider member with the label compartment open, which can be used in the embodiment shown in FIGS. 23a-23d FIG. 61 is a vertical section for illustrating the assembly of a drop-window for the embodiment shown in FIG. 60, FIG. 62 shows, on an enlarged scale with respect to FIG. 60, how the drop-window is fastened, FIG. 63a is a schematicised horizontal section of an embodiment of the device with reduced operating power, FIG. 63b is a vertical section belonging to FIG. 63a, FIG. 63c is an enlarged section of a sliding guide of the slider member in this construction, FIGS. 64a to 64c show how a pile of pictures is prevented from falling out of the device, FIG. 65a shows in cross-section a transparent viewing window for a device, for example, according to FIG. 23, FIG. 65b shows the window in perspective, FIG. 66 shows in perspective and partially broken away the associated lower part of the housing, FIG. 67 shows a front view of a separator belonging to FIGS. 65, 66, with the slider member ledges shown in section, FIGS. 68a to 68d show in cross-section different constructions of the device each having a slider member in one piece and three housing elements fused to each other, FIGS. 69a to 69m show a preferred construction of the rear side of the device with an integrated stand foot, FIGS. 70a to 70c illustrate an alternative construction of the inner stop for the picture pile, FIGS. 71a to 71c illustrate a further alternative for the disablement of the picture change mechanism, FIGS. 72a to 72c show a variation of FIG. 71, FIGS. 73a to 73c show a further variation of FIG. 71, FIG. 74 shows a front view of a picture archive consisting of several devices, FIGS. 75a to 75c show in schematic section the sequence of picture change-over in an alternative device embodying the invention, and FIGS. 76 to 79 are the relevant detailed views, FIGS. 80, 81a, 81b and 81c show, in vertical section, perpendicular to the slider member withdrawal direction, different ways of attaching retentive elements, FIGS. 82a and 82b are vertical sections, parallel to the slider member withdrawal direction, corresponding to FIG. 83 is a plan view onto the pressure plate shown in FIG. 82b, and FIG. 84 is a plan view onto the pressure plate shown in FIG. 81c.

Referring to the drawings, FIG. 1 shows a picture viewing device comprising a housing 100, the housing 100, consisting of an upper shell 102 having a picture window 104 and a lower shell 106. As may clearly be seen from the section shown in FIG. 6, the two shells are positively interlocked and are then glued or welded or jammed together; between the two shells, however, there remains an external groove 108 which acts as a guide groove, for example, for pushing the device into an automatic picture change apparatus. A stop member 110 on the lower shell interrupts the groove; the stop member ensures that the device can be pushed into the guide of the automatic apparatus only in a predetermined position. In order that this is effected with the correct side uppermost the groove is arranged asymmetrically with respect to the main central plane of the device.

Of the slider member it is possible to see in FIG. 1 only the grip part 112 and the front wall 114. The grip part 112 is manufactured separately from the rest of the slider member and is joined to the latter at a later stage, for example by a glued or push-fit connection, as may clearly be seen in FIG. 3. Preferably, the grip part is first injection-moulded from plastics material in one piece with the upper shell of the housing and subjected to a common surface treatment before being separated from the latter; the closed device according to FIG. 1 is thereby given a uniform, attractive appearance.

Since the pile is removed by means of the slider member, auxiliary means are preferably provided in order to prevent the pile of pictures from falling uncontrollably out of the slider member. For this purpose, the grip part can have an extension 116 which is shown by a dotted line in FIG. 3 and/or foamed plastics cushions 118 (FIG. 2) clamp the pile (not shown) laterally in the slider member, and/or resilient tongues 120 having retaining hooks 122 are shaped on at the sides of the slider member rail 124 (FIG. 2)

FIG. 4 shows the main elements of the change mechanism and its disabling device. The separator bar 128 which acts as a retaining device is attached to the slider member 126, whilst the pressure plate 130 is supported on the lower shell 106 of the housing by means of four leaf springs 132. It is preferred that the leaf springs extend from the lower shell towards the slider member grip so that they are not compressed when the slider member is pulled but make it possible for the pressure plate to yield gently when the separator runs over it. A flat base portion 134 of the slider member (cf. FIG. 2) reaches to beneath the pressure plate; as a result, the slider member which is of course otherwise open at the bottom as shown in FIG. 2, is additionally stabilised and the flat base portion 134 provides a broad gripping facility for several fingers.

The pressure plate 130 is preferably an injection-moulded plastics part and has reinforcing ribs 136 on its underside (FIG. 8). Such reinforcements are also provided to some extent at the periphery of the pressure plate but not on the section facing the opening of the housing, so that this opening can yield in a flexible manner. In this region, there is also the cut-away portion 138, into which projects the base 140' (FIG. 2) of the slider member grip.

In two of the reinforcing ribs 136, elongated holes 140 are arranged parallel to the direction of movement of the slider member into which engage projections 142 of a disabling tongue 144. This tongue forms together with a disabling button 146 which is slidably guided in the lower shell an integral plastics part, the tongue 144, however, being flexibly connected to the button. Alternatively, a construction in two parts and a hinge-like connection between the two may be chosen.

The tongue 144 is guided beneath a bridge-like control bar 148 which projects inwards from the base of the lower shell. If the button 146 is moved into the position indicated by a dotted line in FIG. 4 by gripping with the fingers its lower grip face which lies free to the outside and is preferably roughened, this operation being made easier by recess 150 for the finger-tips, the tongue 144 is pressed downwards by the control bar 148 and carries the pressure plate down with it by means of the projections 142 and the elongated holes 140. The pressure plate is thereby disabled.

The position and arrangement of the disabling device can clearly be seen in the plan view according to FIG. 5. It can also be seen in this Figure that the two shells forming the housing extend beyond the width of the side rails 152 between which a slider member is guided, so that these two longitudinal edges are constructed as double walls. On the one hand, this reinforces the housing and, on the other hand, produces a space surrounding the viewing window which is of equal width all round, and provides the opportunity of rounding off the corners of the housing. FIG. 5 also shows indentations 154 in the region of the groove 108 for a purpose to be explained later. The recess 156 in the lower shell is complementary to the flat base portion 134 of the slider member. The depressions 158 and 160, respectively, indicated by a dotted line in FIG. 5, which are let into the rear side only and do not break through it completely are provided for a stand to be described below and the disabling button, respectively, an opening 145 being provided only for a passage of the tongue 144.

The pressure plate together with its springs is illustrated more clearly in FIG. 8 to 14. The four leaf springs are metallic in this case and consist, for example of spring bronze or spring steel.

Small pins are injection moulded onto the underside of the plate and the leaf springs have holes that are complementary to these pins so that the springs can be pressed on and riveted or welded. In a similar manner, the springs can also be fastened to the lower shell although it is sufficient for them to be merely supported in the longitudinal direction there. Narrow extensions 162 of the forward spring pair in the direction of withdrawal extend this pair of springs beyond the point at which they are fastened to the plate 130. They extend by a bow 164 with clearance through corresponding openings 166 in the plate and rest again by their free end on the underside of the plate. The function of these bows 164 is to press the individual picture held firmly by the plate upwards and away from this plate once the separator 128 has passed over the openings 166 in the plate when the slider member is pulled out and, as the slider member is returned, to lift up this picture so that it is lifted away above the separator and the pile that has been removed to the outside in the slider member.

On the upper side of the plate there are three strips consisting of a material that grips strongly the reverse side of the pictures. These elements which are referred to here and hereinafter as "retentive strips" 170 form the transporter which is intended to hold the picture that faces the pressure plate when the slider member is pulled out. As may be seen from FIG. 11, the upper side of the retentive strips which consist, for example, of soft plastics material, is roughened so that dust can collect between the raised parts and the strips are still able to work as a transporter. Furthermore, as indicated in FIG. 13 and 14, small brushes 174 can be arranged on the underside of the separator 174 which slide over the firmly held picture 172 with little friction when the slider member is pulled out (FIG. 13) and clean the retentive strips on the return stroke (FIG. 14).

It is important that level intermediate spaces are left between the retentive strips over the entire withdrawal length of the slider member. The profile of the separator is then so constructed, as indicated in FIG. 9, that the lower edge of the separator touches the surface of the plate 130 in the region of these intermediate spaces 176 and is therefore able to engage beneath the edge of the picture 172, which edge is in turn pushed away by the bows 164.

Laterally, the plate has two more incisions 178 which release the plate which is pressed downwards on the return stroke of the slider member; this is explained in detail in specification No. P 27 42 349. It should however be mentioned that the inherently rather rigid plate has the advantage that the springs no longer tend to tilt when the control cams of the slider member engage laterally in the region of the outer edge of the plate.

FIGS. 15 to 18 show the construction and arrangement of the stand foot.

The base of the lower shell 106 has a circular depression 180 with a through-hole 182 at the centre thereof. The round head 184 of the foot is fastened in this through-hole by means of a through-anchor 186, but is freely rotatable. The stand 188 is flexibly connected to the head in the region of a radial line of the head; a central tongue 190 of the stand projects through a complementary opening in the head and acts as a stop for opening out the stand. The stand is held in the depression 158 by a push button 192 but can be released by inserting the fingers into the finger recess 194.

The centre of the head of the stand foot is equidistant from the opposing longitudinal edge and each of the transverse edges of the housing. When the stand has been folded down from the head it can be turned into three desired angular positions so that the device stands securely as a stand-up frame also in the upright position as indicated in FIG. 18. Since the stand is wider near its free end, the device stands securely also in the upright position. Projections 196 injection-moulded onto the head 184 and indentations 198 complementary thereto in the base of the lower shell serve to lock the stand in the possible angular positions.

The head and the stand are injection moulded in one piece from plastics material.

FIG. 19 and 20 show the device with the change mechanism disabled. The button 146 which is accordingly pushed to the outside cannot be overlooked; it can also be provided on the inside thereof with an illustrative sign. It is also possible to see the indentations 154 mentioned briefly above which mark the centre line of the viewing window. If the device is inserted into some sort of apparatus, for example a motor-driven automatic change apparatus, it should be possible to detect the inserted position of the device and, more accurately speaking, a fixed position relative to the middle of the viewing window. If the devices were of one size only, an end stop could be provided. Since, however, the device is to be constructed preferably for photo-positives of formats $9 \times 9$, $9 \times 11.5$ and $9 \times 13$ cm$^2$ and the centring of the pictures, however, has to be independent of the format, this central indentation is advantageous.

Furthermore, such a motor-driven change apparatus should be able to engage with the device irrespective of the format of that device. Two possibilities for achieving this are shown in FIG. 21a, b, c and FIG. 22a, b, c.

The formats shown in FIG. 21 correspond to the dimensions given above. Holes are provided on the rear side as engagement points for the motor-driven change apparatus, these being a hole 200 in the flat base portion of the slider member (also visible in FIG. 2 and 15) and a hole in the lower shell 106, the latter hole being accessible through a coincident hole 202 in the button 146. (It should be pointed out that the hole is not accessible when the button 146 is pulled out.) As can be seen from FIG. 21, the holes 200 and 202 are the same distance from each other in all formats and are preferably disposed symmetrically with respect to the transverse central plane of the device marked by the indentation 154.

It will be appreciated that the strokes of the slider member are different in the different formats. If the embodiment shown in FIG. 21 is chosen, the stroke length of the motor-drive also has to be changed or adapted when changing to a different format. This is not necessary in the case of the embodiment shown in FIG. 22 where only the longest format has engagement holes 204 and 206, whereas in the case of the other formats elongated slots 208, 210 are provided, so that the stroke, adjusted to the longest format, first runs idle corresponding to the shorter withdrawal length of the slider member and only then takes the slider member with it; accordingly, the reverse stroke of the slider member also begins with a partial no-load stroke.

At the join between the upper shell and the lower shell of the housing there does not necessarily have to be a guide slot but, alternatively the lower shell can be slightly offset inwards with respect to the outline of the upper shell. A construction in which the edges need to be aligned, however, is unfavourable since, for reasons of tolerance, a step will almost always be formed at least at one point.

FIGS. 23a to 23d show in schematic longitudinal section a further embodiment of a picture change device according to the invention. It is again possible to see the housing 250 having the viewing window 252, the slider member 254 with the separator 256 and also the pressure arrangement having the plastics plate 258 and biassed leaf springs 260. An auxiliary spring 262 is also indicated which does not appear in the other Figures and should therefore be described here. If the slider member is puled out very quickly, the separator which runs by means of its inclined face 264 onto the inclined guide face 266 of the plastics plate 258 can accelerate the plate to such an extent that this end of the plate, which, of course, together with the mass of the picture pile 268 supported thereon and the leaf springs 260 forms an oscillatory system, "dips" below the level of the separator lower edge so that this edge, although preferably sloping, does not grip the lowermost-but-one picture and, therefore, two or even three pictures are left behind on the pressure plate 258, whilst the separator takes the remainder of the pile 268 out with it. The auxiliary spring 262 reinforces the system and in this manner acts as a buffer for the plastics plate 258. It should however be pointed out that such an auxiliary spring is necessary only when the biassed leaf springs 260 are fairly soft.

It can also be seen from FIG. 23a–d that the edge of the picture lying on the pressure plate, which edge faces the slider member grip 270 is not supported by the pressure plate since the latter has a step. When the separator runs over this edge 272 of the picture, that is to say shortly before reaching the position shown in FIG. 23c, this edge is curved downwards and springs back into the flat position shown in this Figure while the bent end of the pressure plate comes to rest against the lower edge of the separator. The bent part 274 is so dimensioned that the separator can easily engage under the edge 272 of the picture.

In this construction, therefore, there is no need for the auxiliary resilient legs for pressing the picture upwards, which were denoted by 162 in FIG. 10 and 12.

The pressure plate also has other special features, however, which can best be explained by reference to FIGS. 24 to 30b. As a result of the bent portion 274 mentioned, the relevant trailing ends 278, between which there is a recess 280 into which the grip of the slider member fits, are lower than the main plane of the pressure plate 258 so that even when only a small number of pictures are in the device there are no collisions with the holding-down cams which will be described later with reference to FIG. 60 and 65. Finally, there is produced a clearly marked retentive transporter support, the extent of which is marked in FIG. 23b by 282. As before, the transport (or more accurately speaking, the "retention" of the lowermost picture of the pile 268 in the housing 250) is effected as a result of strips 284 made from a special plastics material of high static friction with the picture support material being mounted on the pressure plate. Four of these retentive covering strips are provided in this case, but this number is not imperative. The important thing, however, is that the height of the strips 284 diminishes over the face of the pressure plate in the direction of the small upwardly projecting step 286 close to the inner end edge of the pressure plate 258. Accordingly, the lowermost picture of the pile lies with its edge, over which the separator runs first, protected behind this step 286, the height of which step is, for example, 1¼ or 1½ times the nominal thickness of the picture support, so that the lowermost-but-one picture is reliably gripped by the separator. The face 288 which faces this edge of the picture is inclined, so that on the return stroke the separator can slide along this face. Owing to the reduction in the thickness of the strips 284, the lowermost picture, lying on the plate is not deformed in the transverse direction when the separator runs over it and, therefore, does bend to rise from the plate and be taken together with the pile by the separator.

The incisions 290 in the region of the end edge of the pressure plate provide space for the picture pile stops 292 which mesh into these incisions.

By means of the above-described measures it is possible to ensure that in each picture change operation the lowermost picture and only this one remains on the pressure plate and all the other pictures of the pile are transported to the outside.

The pressure plate 258 is relatively solid and inherently rigid apart from the trailing ends 278 which are substantially thinner than the main part of the plate; this is shown in FIG. 23a–d. The reason for this is that the picture change-over should of course operate even when the pictures are curved. On the other hand, however, no picture should be retained on the pressure plate when the change mechanism is disabled, that is to say in this case, when the pressure plate is drawn below the level of the side ledges of the slider member. If a picture is curved in such a manner that its central region is closer to the pressure plate than its edges which are supported by the slider member ledges, it is possible, despite the above-mentioned difference in levels (which of course amounts to only a few millimeters or fractions thereof), for the picture and the retentive covering to be in contact, so that movement of the lowermost picture would be hindered when removing the pile. For this reason, the pressure plate also has the two upwardly projecting longitudinal ribs 294, and FIG. 26 shows that, as a result of this construction, even a picture 296 curved in this manner is taken along by the separator when the change mechanism is disabled. This Figure also clearly shows the difference in height between the slider member ledges 298 on the upper face of which rests the picture pile, and the "depressed" plastics plate 258.

Finally, in FIG. 24, lateral runners 300 can also be seen, which runners project beyond the outline of the pressure plate. The purpose of these runners is, in cooperation with the slider member, to release the pressure plate as the slider member is pulled out and to press the pressure plate below the level of the slider member ledges during the return stroke of the slider member; this is explained in detail in the specification No. P 27 42 349.

For reasons of easy accessibility and reliability, these runners are so constructed here that, as the slider member is being drawn out, they are able to yield on contact with the control faces of the slider member, but remain stationary on the return stroke of the slider member, so that the slider member control faces hold the pressure plate in its inoperative position, that is, away from the viewing window 252. Two possible solutions are represented in FIG. 27a, 30a and 27b, 30b respectively.

FIGS. 27 show in each case a view of the pressure plate from below and FIG. 30 show a cross-section through the elements slider member ledge-pressure plate in the position in which the runners 300 come into contact with the slider member control faces when the slider member is pulled out.

According to FIG. 27a, 30a retaining lugs 302 and small support posts 304 are injection-moulded onto the underside of the pressure plate 258. Between the plate and the retaining lugs a slot 306 is formed into which the runner 300 is inserted from the outside. The runner is in the form of a cut-out or perforated platelet, so that a narrow strip 308 is produced which is hung between these small posts 304 so that it deflects resiliently. Near to the end of the runner which is run under first when the slider member is pulled out and hence does not need to yield at first, an approximately semi-cylindrical bearing member 310 is shaped on in the region of the slot 306 and the runner 300 has a recess complementary thereto thus producing a kind of swivel bearing. Only when the control faces of the slider member ledges run over the other end of the runner can the runner 300 swivel inwards about this joint, aided by the wedge-shaped cross-sections shown in FIG. 30a, the strip 308 acting as a spring.

In the embodiment shown in FIG. 27b and 30b this joint has been dispensed with, so that the runner is able to yield even more easily. For this reason, the runner does not require any wedge face as in FIG. 30a but can have a rounded profile as shown in FIG. 30b. This has the advantage that during assembly it is not necessary to take care with regard to the position of the joint nor to the position of the tapered face, but all the runners are capable of operating equally well in the four possible positions.

FIG. 27a also shows an elongated knob 312 injection-moulded onto the underside of the plate onto which is pressed the pressure spring 314 by means of its opening 316 (FIG. 29a), after which the knob can be melted down by means of an ultrasonic welding arrangement in order to secure the spring. Alternatively, the spring 318 (FIG. 29a) can be provided with lateral incisions 320, and corresponding projections 322 of complementary shape on the underside of the plate (FIG. 27b) can be used in the same manner for securing the spring 318.

Since the mass of the runner 300 so formed is extremely low, the cost of materials plays a correspondingly subordinate role. On the other hand, however, the sliding properties must be better than is the case with cheap plastics material, for example polystyrene, as is provided for the pressure plate. For this reason, the runner will be injection-moulded from plastics material having good self-lubrication, for example, from a polyamide.

FIGS. 31a to 31c show alternative constructions of the trailing ends 278 of the pressure plate 258. In the case of unfavourably curved pictures these trailing ends should of course nevertheless first hold by their retentive coverings the lowermost picture when the picture change-over movement begins (see FIG. 23b). If there is a curvature similar to that shown in FIG. 26 or even a curvature in the opposite direction, the lowermost picture might be released from the pressure plate by the separator.

For this reason, in FIG. 31a, in addition to the two trailing ends described above, a third, central trailing end 278' is provided which would of course necessitate the reconstruction of the slider member grip and the pile stops thereon. Alternatively, in FIG. 31b, the respective trailing end 324 is connected to the actual plate 258 by an injected or embedded leaf spring 326 of steel and curved upwards in the direction of the pile with respect to the main plane of this plate, so that the lowermost curved picture is gripped, straight pictures or those curved in the opposite direction, however, are pushed back by the trailing end against the bias of the spring (a construction of the spring as a thin plastics strip formed on by injection moulding is not possible when using cheap plastics material on account of the cold-flow property thereof; it should be pointed out that the bias of the spring is in the order of magnitude of approximately 500 p). Alternatively, in accordance with FIG. 31c, there can be provided as connecting pieces for the trailing ends 328 narrow, metal leaf springs 330 loaded in torsion. In the case of the last-mentioned construction, modification of the slider member with respect to the "simple" pressure plate 258 according to FIG. 24 is not necessary. FIG. 32a–d show in each case, in a construction substantially restricted to the operating elements in schematic view, different constructions for the separator, on the one hand, and the pressure plate on the other hand. The separator slides with its lower edge over the surface of the pressure plate and has to have recesses to allow for the penetration of the retentive coverings. In its cross-section the picture on the pressure plate has to follow this contour, but can in no way be bent with sharp edges. The outcome is that the picture may possibly lie only against the edges 332 of the retentive coverings, and is not correctly held. This relatively unfavourable situation is to be expected most frequently with the form of embodiment shown in FIG. 32a. The arrangement illustrated in FIG. 32b, with the retentive coverings 334 of broader surface area and wider openings 336 in the separator is similar. Extremely large openings are provided in the separator shown in FIG. 32c, which, during its return stroke, depresses the pressure plate only with a kind of "point" 338 to such an extent that the retentive coverings do not abrade the lower edge of the separator. An especially good clinging fit of the picture on the retentive coverings 340 in FIG. 32d is achieved by their rounded cross-sectional shape matching the contour of the picture.

It should be noted that, in the FIGS. 32, the picture held in each case is not illustrated, the separator, therefore, is shown during its return stroke, its lowest point (lower edge) being closer to the housing base than the upper side of the slider member ledges 298.

FIG. 33 to 41 relate to the shape and assembly of the disabling arrangement in a device, for example as shown in FIG. 23a–d.

FIG. 33 shows the housing 342 of the device (without slider member) from below, and a button 346 provided with finger ribs 344 can be seen, this button being displaceable in a depression 348 of the housing base. This is all that can be seen from the outside.

FIG. 36 shows the button 346 viewed from the housing. The button is in this case also an injection-moulded plastics part having a reinforcing rib 350 running almost all the way around it and lateral operating arms 352 and 354.

In FIG. 34, the button is shown in the position in which the picture change mechanism is activated. In order to disable the change mechanism, the button 346 is displaced along the depression 348, the button thereby engaging over a rib 360 which is injection-moulded onto a housing bridge 364 and received in a groove 362 of the button. On the button 346 there are shaped by injection moulding operating arms 352, 354 extending laterally, and these arms, in the disabling position of the button 346, engage over the leaf springs 260 and depress these that is to say, hold them at a distance from the window opening in the housing. The shorter arm 352 has no other function. The longer arm 354, during the displacement of the button, runs onto the inclined face 356 of a control strip 358 formed on the base of the housing, and is thereby bent upwards relative to the rest of the button, that is, towards the viewing window. As long as the slider member still remains in the interior the housing, however, the free end of the arm is still held depressed by the adjacent slider member ledge (FIG. 38). If the slider member is now pulled, the arm snaps upwards; during the return stroke of the slider member the end edge of the slider member ledge then runs onto the arm and pushes it, and thus the whole button, into the change-activating position again. Because the plastics material used for the button may have a cold-flow tendency, for reliability a further reverse control inclined face 366 is provided on a further control strip 368; onto this sloping face 366 runs the humped part 368 of the button arm 354, and is pressed back provided that the arm does not spring back anyway.

FIG. 35 indicates how the button is assembled in the housing base; first of all, the longer operating arm 354 is threaded through the slot 370 between bridge 364 and the housing base and the button is then so turned that, diagonally opposite, the shorter operating arm 352 can be pushed through the slot 372 arranged opposite. This is rendered possible by a cutaway portion 374 in the circumferential edge reinforcing of the button 346 (FIG. 36). The button is now turned into its correct position, the operating arm 354 having to move across the control strip 358 which for that reason again has a mounting inclined face 376. Finally, the button with its groove 362 arrives at over the rib 360, and lugs 378 at the edge of the depression 348 engage over a step 380 of the button 346. A projection 382 of a triangular configuration reinforces the bridge 364.

FIGS. 42a to 45c illustrate alternative forms of embodiments for the arrangement and mode of operation of the disabling device.

In the variations shown in FIGS. 42a-c, the disabling button 386 is slidably guided in the housing base 384; the disabling button 386 has lateral arms 388 which engage over the pressure springs 390 during displacement of the button, in a manner similar to that described previously. At the same time, an extension 392 on the button runs onto a control slope on the housing base, which is marked with 394, so that the extension is bent upwards and projects through a slot 396 in the pressure plate into the path covered by the separator 398, and yields resiliently when the latter is pulled out. During the return stroke of the separator, during which there is no picture between the separator and the free end of the extension, the separator is able to push back the extension, and thus the button, into the activating position.

The embodiment shown in FIG. 43a-b operates in a similar manner; the extension extends in the opposite direction to the withdrawal direction of the separator so that the button 400 is not pushed back but is pulled back when the separator hooks onto the hook 402 of the extension.

Compared with this embodiment, the embodiment of FIGS. 44a-b is simplified in that no separate run-on slope is provided for the extension 404, rather, the hook 406 thereof abuts against the edge 410 defining the plate slot 408, for as long as the change mechanism is activated. After displacement of the button, the hook projects, as before, through the slot, wherein its resilience is restricted by a cross-pin 412 which is supported laterally with respect to the long edges 414 of the slot. In the embodiment shown in FIGS. 45a-c, the button, in order to disable the change mechanism, is not displaced in the direction in which the slider member is withdrawn, but in the opposite direction, and is then returned to the activating position when the change slider member is pulled out for the first time. FIG. 45a shows the schematic longitudinal section, the arrow 414 here indicating the displacement direction of the button 416 into the disabling position; the action brought about by arms 418 engaging over the springs 420 is effected as described above. At the same time, two extensions 422 which simply lengthen the arms 418 depressing the springs, run onto control strips 424 and are thereby pushed upwards so that their free ends move into the path of movement of two lugs 428 shaped on the slider member ledge 426, these lugs pressing the button back into its initial position during the withdrawal movement of the slider member; in that operation, the slider member of course transports the complete pile to the outside because the pressure springs 420 have been depressed for a sufficiently long time.

FIG. 46 shows in a perspective, exploded view, an alternative possibility of anchoring the disabling button which acts on the pressure springs 430, in the housing base 432. On its inwardly pointing face, the button has a T-shaped stud having a central arm 434 which fits in a sliding manner into the slotted portion 446 of a housing opening 448, and having a T-bar, indicated by 450, which just fits through the insertion portion 452 of the opening 448. In its interior, the housing base 454 has two injection-moulded pins 456 onto which the pressure plate springs 430 are placed by means of their holes 460. Near this fastening point, the spring which has an approximately U-shaped outline is provided with an auxiliary tab 462. If the button is now guided with its T-bar 450 through the portion 452 in the opening and moved in the direction of the spring fastening along the slotted portion 446, the auxiliary tabs 462 are guided resiliently outwards and spring back into their original position again as soon as the button has reached its final position. If the button is again pushed in the direction of the insertion portion 452, the springs are depressed by the T-bar, whilst the button itself can no longer be removed.

FIGS. 47a-b illustrate how the plate pressure springs 260 are advantageously fixed in the housing 250. Each spring 250 has at one end a T-shaped cut-away portion 464, which, as illustrated, fits over a peg 466 of H-shaped cross-section shaped on the housing base. In this manner, the spring in fact tilts in its rocking movement about its free end edge, which occurs smoothly and noiselessly. If the spring is made of time bendable, steel, then the embodiment of FIG. 48a,b which is even smoother in operation, is advisable.

It is obvious from the above explanations that, during the action of the disabling button on the pressure plate springs, these are not pulled down at their highest point (that is, their point lying nearest the housing viewing window), because it is at this point, of course, that the pressure plate itself is fastened. However, it is desirable for the plate to be pulled as close as possible against the housing base. This can be achieved, at least approximately, with the constructions as shown in FIGS. 49a to 54.

According to FIGS. 49a-b, the disabling button 466 acts, as before, on the pressure springs 260. There is, however, also a further hook 468 shaped on the button, with which is associated a counter-hook 472 on the pressure plate 470, in which the hook 468 becomes hooked shortly before the disabling position of the button is reached, and pulls the end portion of the pressure plate 470 nearest the slider member completely towards the housing base as a result of the wedge faces 474 and 476 of hooks 468 and 472 respectively, becoming effective. Alternatively, the hook 468 may, as shown in FIGS. 50a-b, also act on a transverse arm 478, which joins the two pressure springs 260' together.

An alternative is shown in FIG. 51. Here, the arm of the leaf spring 480 facing the button 486, starting from the fastening 484 on the pressure plate 482, is exactly the same length as the possible displacement path 488 of the button, whilst the other spring arm is correspondingly longer. This may perhaps mean different contours of the two arms, in order to ensure a uniform rocking movement of the pressure plate, but that is obvious to the expert and, therefore, it has been possible to dispense with a drawing.

A variation is shown in FIG. 52. Here, the spring arm 492 facing the button 490 is provided with a, for instance, angular deformation 494, so that in the disabling position of the spring, shown by a broken line, the pressure plate 496 is similarly pulled down low as in FIG. 51, although the fastening point between the plate and the spring lies at a distance from the final position of the button.

FIG. 53 shows in schematic longitudinal section a further possibility of bringing about a maximum movement path of the pressure plate away from the housing viewing window using a relatively small movement path of the button. In the base 500 of the housing there is mounted so as to rotate about a peg 502 a plate cam 504 which can be pivoted by means of a key 506 accessible externally on the housing through an angle of, for example, 60° C. The plate can engage loosely over a control piece 510 bent backwards from the spring arm 508 in the direction of the plate 504, so that the movement of the spring during the change operation is not obstructed. The plate cam, however, has a contour approximately corresponding to an Archimedian spiral, so that when the key 506 is turned, as illustrated by a broken line in FIG. 54, the spring arm is considerably extended and thus the pressure plate 512 is pulled towards the housing base 500.

FIGS. 55a, 56a and FIGS. 55b, 56b, each illustrate alternative constructions as substitutes for the runner arrangement as shown in FIG. 27a or 27b. Instead of arranging the laterally yielding runners as shown in those Figures, on the pressure plate, and arranging rigid control strips on the slider member, in this case the control faces of the pressure plate are rigid, whilst moving runners are provided on the slider member. The movement of the runners is positively guided by guide members shaped on the housing base.

In the form of embodiment shown in FIGS. 55a, 56a, on the underside of the slider member edge 514 there is let in a pocket 516 and the pocket wall facing the interior of the housing has three openings 518. On the floor of the pocket there is an anchoring hole 510. The runner 522, in a similar manner to that shown in FIG. 27a or 27b, has a resiliently yielding strip 524 having an anchoring extension 526 which fits tightly in the hole 520. From the control face part 528 of the runner there extends to the other side, and thus beyond the underside of the slider member ledge, a control cam 530 with which on the base of the housing 532 there is associated a control guide member 534. Starting from the pulled-out position of the slider member shown in FIG. 55a, the control cam is guided along the inner edge of the guide member 534, the pressure plate (not illustrated) being held down by the extensions 536 of the runner control face, as these extensions project with play through the openings 518. Finally, the control cam 530 strikes an inwardly pointing curvature 538 of the control guide member and is deflected inwards as a result, the resilient strip 524 thereby yielding. If the slider member is then again pulled, the control cam 530 runs along the outer side of the guide member, the control face of the runner being pulled back into the pocket 516 of the slider member ledge 514. The runner, as illustrated in FIG. 56a, is assembled as follows: first of all, at an angle from below (FIGS. 56a, 56b show perspective views of the slider member ledge from below) the extensions 536 are pushed through the openings 518, the runner undergoing slight distortion, and the anchoring extension 526 can then be pressed into the hole 520.

The form of embodiment shown in FIGS. 55b, 56b, differs from that previously described in the construction of the runner and its mounting and method of fastening in the slider member ledge, whilst the control guide member remains unchanged. Here, the runner is loosely held by two stops 542 engaging over the runner at the side. The stops lie in the plane of the underside of the slider member ledge. The pocket 544 is open in the direction of the pressure plate (not shown) and at its bottom has two jamming cams 546, 548 for the resilient strip 550 of the runner. The runner, as indicated in FIG. 56b, can be pushed parallel to itself beneath the stops 542, the strip 550 sliding resiliently upwards along the sloping mounting face 552 of the jamming cam 546. The strip is then pressed between the jamming cams. It is obvious that, in the two forms of embodiment described, the assembly can be carried out by machine.

FIG. 57 shows, once again on a scale approximately true to size, the levels important for the operation, namely, the level of the upper side of the slider member ledge 560 (level A) on which the picture pile rests, the level of the lower side of the separator 562 (level B), which is always lower than level A (it should be remembered that the separator is a part of the slider member), and finally level C, which indicates the effective surface of the transporter retentive covering when the pressure plate 564 is depressed.

Theoretically, under these circumstances a reliable removal of the pile should always be assured, even when the pictures are misshapen. But even with perfect pictures, it occasionally happens that the separator is bent back to such an extent as it runs onto the inclined face 266 of the pressure plate (FIG. 24), that the picture lying on the pressure plate is gripped only at its edges or near the edges which extend parallel to the direction of withdrawal of the slider member; this is indicated by arrows 566 in FIG. 58b, whilst FIG. 58a is intended to show, on a much exaggerated scale, the corresponding bending of the separator 568. As a result, the picture 570 arches inwards, and is compressed not only in the direction of the arrows 566 but is also given a "hump" 572. The middle region of the separator can catch on this and transport the picture with it, or even do considerable damage to the picture. Relief is given in this case by the backswept design of the separator 568', again shown highly exaggerated in FIG. 58c, in which the middle region 574 runs first onto the pressure plate. It is then possible to construct this side of the separator running onto the inclined face 266 by, for example at an angle of 18° (FIG. 59.) so that the separator takes up relatively little space; the steeper this edge is, the smaller is the risk that one picture will be left behind on the pressure plate during the change operation; on its rear side, however, an angle of 30° or more is advantageous so that the picture to be lifted up by the pressure plate slides on easily.

FIGS. 60 to 62 shows in detail the construction of the slider member close to its grip end; such a slider member is able to co-operate in a device with the pressure plate shown in FIG. 24.

The slider member ledges 580 with injection-moulded lateral guides 582 and the grip 584 in the middle of the front wall can be seen. The transverse ledges of the pictures resting on the ledges 580 can be supported against the grip 584 and the lateral stops 588. The grip 584 and stops 588 are hollow. The stops 588 have on their upper side an incision 590 in which the holding-down cams on the housing (these are explained hereinafter) are located. On the underside of the slider member the ledges are connected by a base cross-member 592. The base cross-member fits into a complementary cut-out portion of the housing, which, as can be seen, for example, in FIG. 41, does not reach right across the entire width of the housing. For that reason, between the lateral guides 582 and the base cross-member 592, there remains a corresponding space, and the lateral guides are in this region accessible at their lower edges. Close to their ends, these lower edges each have an elongate incision 594, into which a hinge-pin 596 of a label cover 598 is rotatable. When assembling the label cover, this is resiliently deformed and snaps into the incisions 594. Between the front wall 586 and the label cover made of transparent plastics material, a label (not shown) can be inserted; thereafter the cover 598 is hinged up out of the insertion position illustrated in FIG. 60 and locks with teeth 600 shaped on it in a notch 602 on the underside of the top wall 604 of the grip. The outer side of the cover 598 then closes flush, as can be seen from the vertical section of FIG. 61. FIG. 62 shows, on an enlarged scale, the locking mechanism of the label cover. The cover can be detached, when the slider member has been pulled out by pressing with the fingers in the region of two inwardly-projecting curvatures 606 in the front wall. Edge projections 599 shaped on at the inner corners of the label cover hold the inserted label.

FIGS. 63a to 63c show how, in a device as shown in FIG. 23a, the slider member 270 is arranged and slidably mounted in the housing 250.

It can be seen that the slider member does not lie in flat contact against counterfaces of the housing, but only at the points 610, 612, 614 and 618, with the result that the risk of jamming and the ensuing tight movement, especially at the start of the withdrawal movement of the slider member, is reduced. Also visible are the stop projections 616 shaped laterally to the separator on the slider member, which stop projections limit the withdrawal movement of the slider member when they run against the housing edges 620. Also the unnerside of the slider member ledge 622 runs only in linear contact of ribs 624 on counter-ribs 626 of the housing 250. In these Figures the space remaining between firstly, the opposite faces of the housing 250 and, secondly, the slider member 260 is not, of course, shown true to scale, but on an exaggerated scale.

FIGS. 64a to 64c illustrate the supporting of a pile of pictures and its insertion into the slider member. The front edges 670 of the pile are here supported in the middle against the slider member grip 672, on either side of which a gripping opening 674 remains free; through these openings the pile can be gripped by the fingers and removed over the grip (FIG. 64b). On the upper edges of the lateral slider member guides 676 there are shaped holding strips 678 beneath which the pile is pushed from the slider member grip; the pile is therefore unable to fall out even when the apparatus is held upside down, as illustrated in FIG. 64a. From the inner side of the upper housing plate 680 with the viewing window 682 there projects towards the pile recessed ribs 684; the uppermost picture of the pile is positioned against these under the action of the pressure plate when the device is closed. FIG. 64c shows that the profiles of these ribs, on the one hand, and the holding strips, on the other hand, lie adjacent and slide against one another with stepped portions 686 and 688 respectively; without these stepped portions the manufacture of the relevant parts from plastics material in the injection-moulding process would be difficult, because then the ribs forming the frame would as a whole be too thin.

FIG. 65a shows in front view and FIG. 65b shows in perspective plan view, the so-called upper shell of the housing, which is injection-moulded from transparent polystyrene or another transparent plastics material. For that reason in FIG. 65b parts that are shaped on the inner side of this upper shell can also be seen; for clarity, the faces of these parts, which lie flush with the inner side of the shell, are cross-hatched in FIG. 65b.

The upper shell is generally of U-shaped cross-section with side faces 700 and a top face 702. Supporting posts 704 project outwards from the side faces. The holding-down cams already mentioned above and denoted by 708 are shaped on the inside, near to the grip cut-out portion 706. Close to the opposite end there are provided stops 710 against which the corresponding transverse edges of the uppermost pictures in the pile can be supported.

FIG. 66 shows in perspective, partially broken away, the so-called lower housing shell of double-walled frame construction. The inner struts 712 are congruent with the upper shell side walls 700 and along the contact faces the two shells are welded together ultrasonically. In the plane of the upper edges of outer rails 714 and the end wall 716, the ultrasonic welding is then carried out to a cover frame which also covers the parts 708, 1710 and 684 still visible through the window face in FIG. 65a, which will be explained hereinafter.

From the end wall 716 of the housing the two picture edge stops 718 project inwards. They, and likewise the stops 710 and the holding-down cams 708, have to clear the path of the slider member and especially the path for the separator forming one part of the slider member (shown in front view in FIG. 67). For that reason, the slider member has corresponding cutaway portions 718', 708'; the latter also clear the way for the stops 710. The cut-away portions on the underside of the separator allow the transporter retentive covering to pass freely through, as described in detail above.

Figure 68A:
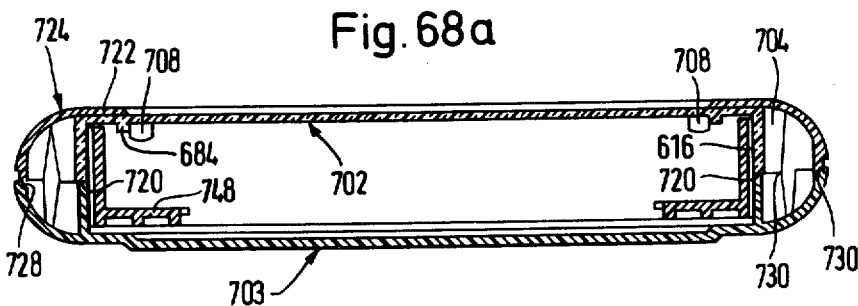

FIG. 68a show in cross-section the fully assembled nevice, but without the parts forming the change mechanism, namely the pressure plate and the separator, as in this case it is assembly that is to be explained.

The lower shell 703 and the upper shell 702 are positioned one against the other at 720, whilst the stop 616 projects upwards from the lower shell (FIG. 63a). Engaging with a peripheral border 722 over the upper shell, the cover frame 724 is fitted at 726 into an inwardly directed groove 728 of the lower shell. In a vertical direction, the lower shell and the upper shell and, if desired, also the cover frame, are mutually supported by means of lateral projections similar to 704 (FIG. 65b), so that a thin-walled, but nevertheless stable, hollow frame construction is obtained, which is welded ultrasonically at 730. The upper shell is positioned in the cover frame in a positively interlocking manner. Somewhat different from this is the form of embodiment shown in FIG. 68b. Here, the upper shell 732 is merely a plate, which is first of all welded to the cover frame 734. The stops for the withdrawal of the slider member are each arranged on the side struts 736 of the slider member and co-operate with counterstops on the lower shell 738 of the housing, which are not visible in this sectional view. The lateral supporting posts of the frame constructive are not illustrated in this Figure and in FIGS. 68c, d; they correspond approximately to the form of embodiment shown in FIG. 68a.

Figure 68B:
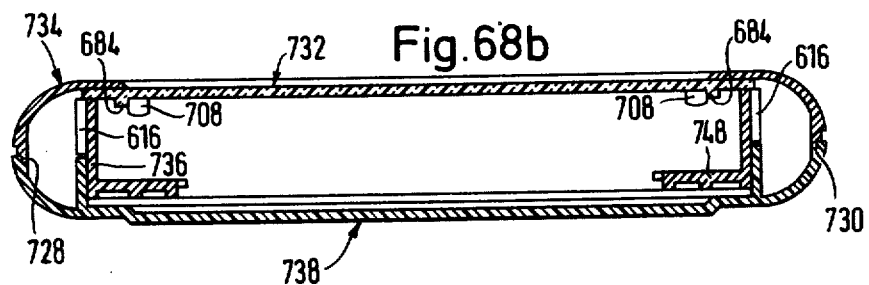
Figure 68C:
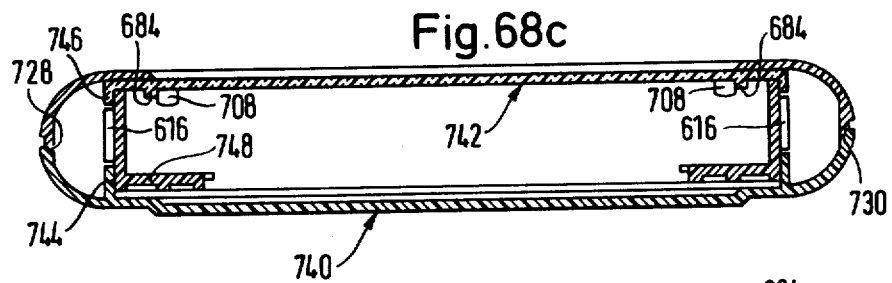

In FIG. 68c, narrow lateral rails 744 and 746 project towards one another from the lower shell 740 and the upper shell 742 respectively, between which rails the stops formed on the slider member 748 run. The counterstops are then provided both on the upper shell and on the lower shell.

Figure 68D:
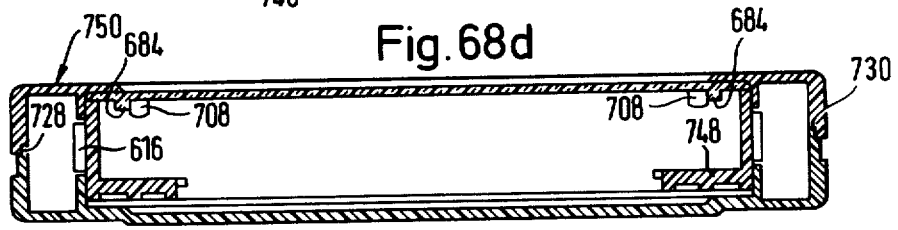

According to FIG. 68d, the lateral rails of the upper shell are not shaped on this itself but on the cover frame 750. These lateral rails at the same time centre the plate-shaped upper shell, which is then welded ultrasonically to the cover frame. For the rest, this construction corresponds to that of FIG. 68c. However, it can be seen that in this case the outer countour is less markedly rounded than in the other embodiments, but this is only of aesthetic significance.

FIGS. 69a to 69m, show the arrangement and construction of a stand foot in a device for example as shown in FIG. 33 to 41. In FIG. 69a the entire device can be seen from the rear with the stand foot 752 opened out. The stand foot has a long time 754 and a transverse limb 756 and is connected by means of hinges 758 to the lower shell 760 of the housing such that, when opened out, it permits the device to be set up like a table-top stand both in upright format and sideways format, but when folded in, lies flush with the external face of the lower shell, so that the device may optionally also be used as a hanging frame. For that purpose, eyelets 761, 762 are provided.

On the lower shell 760 of the housing there is provided a depression 766 accommodating the foot 752; furthermore, there can be seen a finger incision 764 for the movement of the foot and three slot-shaped openings 76, 777 and 778. In the slot 777 there locks an elongated stud shaped on the foot 752, the strips defining the slot 777 then being able to move resiliently into the slots 776 and 778 respectively. The stud 768 is illustrated in FIGS. 69b and c.

FIGS. 68d-j shows in detail the construction of the hinges 758. Description of only the one hinge will be sufficient, the other is mirror symmetrically constructed. In FIG. 69h, which shows a plan view onto the rear side (lower shell) of the device, in each case those sections are marked which are illustrated on a greatly enlarged scale in FIGS. 69d-f, namely with the foot 752 folded in. FIG. 69g is a section corresponding to FIG. 69f but with the foot opened out. Viewed in the axial direction of the hinge, three portions can be distinguished: the stop portion as shown in FIG. 69d, in which a roll-off edge 780 on the foot engages in a complementary roll-off groove 782 of the lower shell, a holding portion as shown in FIG. 69e, in which a hinged portion 784 of the foot is snapped into a hinge aperture 786 in the base of the lower shell, (a flat portion 788 of this base is laterally limited by slots so that it is able to yield resiliently outwards cf. FIG. 69j), and a locking portion as shown in FIGS. 69f, g, wherein a projection 790 shaped on the foot 752 snaps resiliently over a rib 792 when the foot is opened out or folded in. In that operation, a second flat portion 794, likewise limited by slots 796, yields inwards. The opening out angle of the foot is defined by its stop edge 798 (FIG. 69g).

FIG. 69k shows, again on an enlarged scale, the eyelet 762 past which the slider member has to slide. For that reason a wall hook, on which the device hangs, must not project too far into the housing so that the eyelet opening in the interior of the housing is closed off by a transverse wall 799 (FIG. 69m).

The difficulties which may arise as a result of the comb-like construction of the separator have been described above. FIGS. 70a to 70c show an alternative construction of the device in which the recesses in the base of the separator 718' (in FIG. 67) can can be dispensed with. The edge stops 718 (FIG. 66) shaped on the housing are in fact, replaced by a leaf spring 800, which is biassed in the manner shown in FIG. 70c, but which is pressed flat, as the slider member 802 is closed, when the separator 804 strikes against it. In this phase of the picture change, no picture edge is in fact present there. FIG. 70a shows the arrangement with the device closed in vertical section.

FIGS. 71a to 73c show three further alternatives for disabling the change mechanism. After the preceding detailed explanations its should be sufficient here briefly to describe only the operations.

According to FIGS. 71a to c, a lifting pin 810 is mounted close to the housing base 812 on a leaf spring 814, which can be deflected by means of a pin projecting outwards through the base 812 and thereby, when the slider member is closed, lifting the pile 818 resting on the pressure plate 816 from its transporter retentive covering (not shown) via the lifting pin 810. If the slider member 820 is pulled, the lowermost picture of the pile catches in a step 822, or, as indicated in FIG. 71c, in notches 824 of the separator, so that the slider member transports the entire pile to the outside although the end of the lowermost picture of the pile facing away from the separator still rests on the transporter retentive covering. The notch 824 can be of a generous size, for instance, of a thickness up to three pictures.

In the form of embodiment shown in FIGS. 72a to c, the pressure plate, as described in detail above, can be drawn downwards for the removal of the pile; however, this is not absolutely necessary. With the button 830 a resilient hook 832, which is biassed in the manner shown in FIG. 72c, is pushed out of a passage 834 at the side of the pressure plate, the passage being recessed in the slider member ledge. The resilient hook engages below the edges of the picture pile 836 nearest the separator and, together with the button 830, is transported by the slider member so that the pile is safely brought out. Here, however, the accessibility of the button 830 is less advantageous than above, referring to FIG. 34 et seq. FIG. 72b shows in vertical section the position of the button 830 during the picture change, the button having been displaced into the disabling position (pile-removal position) in FIG. 72c.

In the solution according to FIGS. 73a-c, the button 840 actuates, via a rod system 842, two lateral wedge rails 844, which thereby push out lifting pins 848 for the pile 850 that are let into the slider member ledges 846 so as to move vertically, to such an extent, that the lowermost picture can no longer lie on the pressure plate (not shown) and the separator brings the pile safely out. The illustration is schematic only; stops, biassed springs and the like are not shown. FIG. 73c shows on the left in cross-section the change position, and no the right, the removal position. FIG. 73a is a schematic plan view, FIG. 73b is a schematic longitudinal section.

FIG. 74 shows in schematic front view several devices as shown, e.g. in FIG. 68b placed one above the other, and it can be seen that a step 852 shaped on the housing base fits exactly into the inner contour 854 of the cover frame of the device located below. The step can be brought about by the need for a wall thickness that is greater with respect to the rest of the housing (button guide, stand foot). Owing to this structural feature, a relatively large number of devices can be transported stacked one above the other without the device being able to slide off one another. In FIG. 74 the position and size of the label shown in FIG. 60 can be seen very clearly; it should be pointed out that in that Figure, the slider member was shown without the housing parts.

FIGS. 75a to 79 finally show an alternative construction for depressing the pressure plate assembly during the return stroke of the slider member, because, optionally, the runners (FIGS. 24, 27, 55, 56) may prove to be uneconomical for reasons of cost and wear.

FIGS. 75a-c show schematically the following principle: a type of "catch" engages in a controlled manner over the end edge of the pressure plate 902 nearest the housing opening, and the plate is released as the slider member is pulled (FIG. 75a), the catch locks on the plate in the outer end position of the slider member, holds the plate down at this edge, as the slider member is pushed back in and depressing the other end of the plate with its separator (FIG. 75b), and finally the catch releases the plate again as soon as its inner end position (FIG. 75c). The mechanism for disabling the picture change is only indicated here; for example the embodiment of FIGS. 33-41 could be used.

FIGS. 76 to 79 show these alternatives in detail but always schematically in order to render the important details clear.

Figure 78:
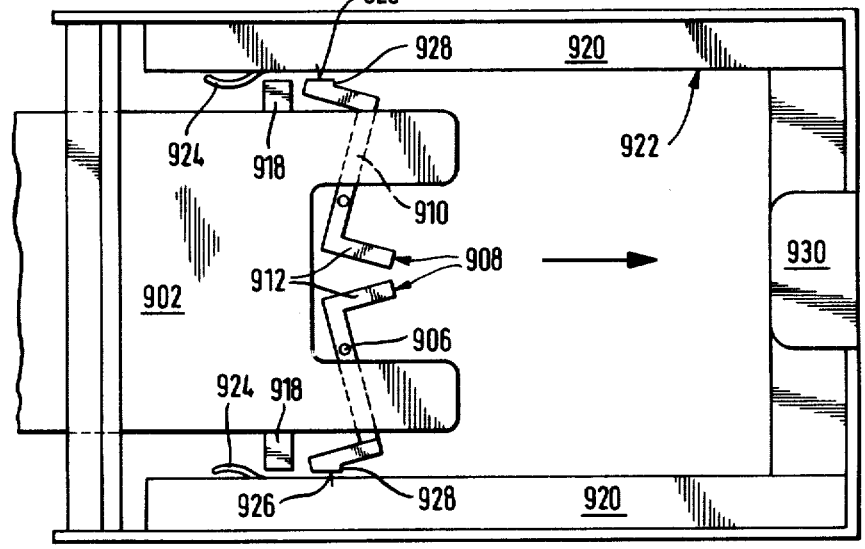

On the base 904 of the housing there are rotatably mounted about hinge pins 906, which extend at right angles to the plane of the base 904, two pivoting hooks 908. One of the hooks is shown in perspective in FIG. 76. Along the housing base 904 runs a two-armed lever element 910 having a run-on arm 912 at one end, the inner end, and a hook arm 914 at the other, outer end which is connected to the lever element 910 via a vertical post 916. On sides of the pressure plate 902 there are shaped locking bars 918 in the form of platelet-like extensions. The ledges 920 of the slider member 922 carry at the side actuating arms 924 that are resilient in an outward direction which, when they pass the hook arms 914, slide on the external inclined face 926 thereof and yield outwards, when the slider member is pulled (FIG. 78). Because, during this phase of the picture change, the pressure plate must be freely movable, the hook arms do not engage over the locking bars 918 of the plate.

Figure 77:
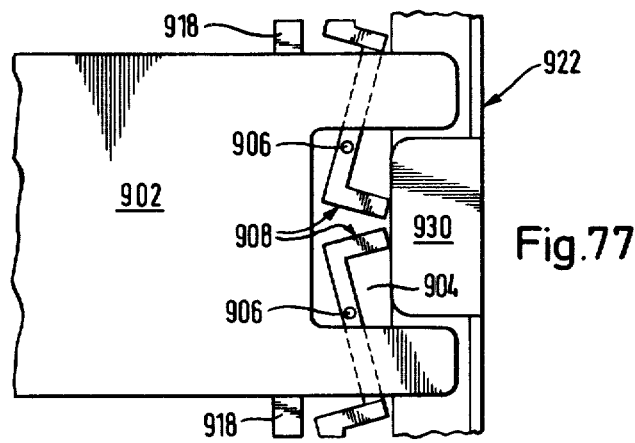
Figure 79:
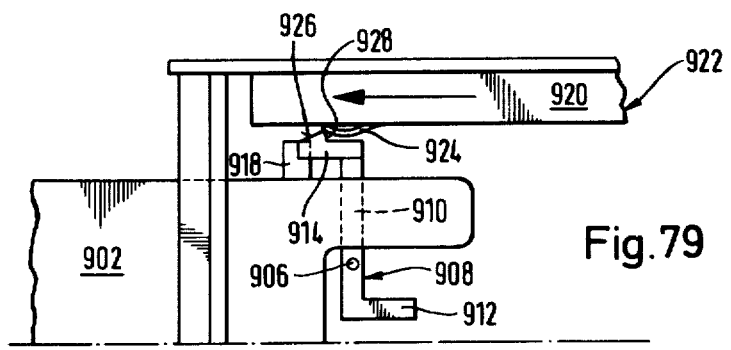

When the slider member 922 is pushed back, the free ends of the actuating arms 924 run onto the stop projections 928 on the hook arms and pivot these into the position shown in FIG. 79; after that, they are able to move past these projections, wherein they yield resiliently outwards again. The hook arms now hold the pressure plate 902 locked until the slider member grip 930 meets the run-on arms 912 and presses the pivoting hooks back again, whereupon the pressure plate is released again (FIG. 77). Special stops for limiting the pivoting movement are not provided here, since the one end position is defined by the limitation of the locking bars. Instead of two hooks acting laterally on the plate, it is also possible to provide a single hook which acts on the pressure plate approximately at the centre thereof.

There are various ways of attaching the retentive elements and some are shown in FIGS. 80 to 84. To a certain extent, the method of attachment also depends on the material used as retentive element; for example, natural or synthetic rubber, polyurethane, silicone rubber, soft-PVC (polyvinyl chloride) have proved suitable. Some of these materials can be extruded and can then be inserted as shaped members 940 into complementary recesses 942 in the pressure plate (FIG. 80), or, provided with self-adhesive tape, can be processed from a reel by being stuck to the plate in a suitable apparatus. Some materials can also be applied by means of spray guns or in the form of pastes. Truly economical is the method in which first, the plate is manufactured by injection-moulding and the retentive elements are then likewise applied by the injection-moulding method in the same mould or in a different mould, provided that the retentive material is injectable. The retentive elements can then be anchored in the plate in a positively interlocking manner by injecting anchoring members 950 through the holes 952 in the plate (FIGS. 81–84). This type of attachment also renders possible different arrangements of the retentive elements, for example, in the form of rows of small heads (FIG. 84), staggered interrupted rows (FIGS. 83 and 82b) or, alternatively, in the form of simple strips (FIG. 82a). FIGS. 81a, 81b and 81c illustrate that, with this technique, also the outlines of the retentive elements, which as described above with reference to FIGS. 32a-d play an important role as regards operation, can be adapted in a virtually optimum manner, for example to the thickness of the picture carrier. With regard to FIG. 83, it should be mentioned that an overlapping 954 of the individual elements 956 and 958, respectively, of adjacent rows is desirable.

It is also possible to form the retentive elements locally during the injection of the pressure plate from the material of the latter by making this material retentive during the injection process by physical means, for example by subjecting it to a static field.

I claim:

1. Picture viewing device having a housing for accommodating a pile of pictures, of which the uppermost picture lies beneath a housing window, having a slider member that may be pulled out of the housing and re-inserted parallel to the viewing window, and having a picture change mechanism consisting of a transporter, by means of which a picture can be removed from one side of the pile as the slider member is withdrawn and is guided to the other side of the pile again as the slider member is pushed in, and of a retaining device preventing the remainder of the pile from being transported, and having an externally operable device for disabling the picture change mechanism for the removal of the entire pile out of the housing by means of the slider member, the retaining device being provided in the form of a separator on the slider member and the transporter being provided in the form of retentive elements on a pressure arrangement located in the housing under spring bias, wherein the pressure arrangement comprises a plate supported by springs, the plate being of dimensions substantially corresponding to the size of the pictures, and on which the retentive elements are arranged.

2. Picture viewing device according to claim 1, wherein the pressure plate is an injection-moulded plastics part, and the springs are metal leaf springs.

3. Picture viewing device according to claim 1, wherein the pressure plate is an injection-moulded plastics part and the springs are metal wire springs.

4. Picture viewing device according to claim 1, wherein the pressure plate in the withdrawal direction of the slider member reaches to beneath the separator when the slider member is pulled out.

5. Picture viewing device according to claim 4, wherein the part of the plate in the region of the housing opening perpendicular to the plate is flexible compared with the substantially more rigid remainder of the plate.

6. Picture viewing device according to claim 5, wherein the flexible part of the plate is divided into tongues by incisions extending inwards from the housing opening.

7. Picture viewing device according to claim 2, wherein the pressure plate is reinforced in its region remote from the housing opening by ribs facing the housing base.

8. Picture viewing device according to claim 5 or 6, wherein the part of the pressure plate facing the housing opening is constructed so that it is angled away from the housing window.

9. Picture viewing device according to claim 8, wherein the angled parts of the pressure plate are flexibly connected to the remainder of the pressure plate.

10. Picture viewing device according to claim 9, wherein the flexible connection is formed by metal springs.

11. Picture viewing device according to claim 6, wherein the incisions are constructed complementary to an inwardly projecting grip base of the slide member.

12. Picture viewing device according to claim 2, wherein the end edge of the pressure plate remote from the housing opening has a step projecting upwards in the direction of the housing window and having sloping run-on faces for the separator.

13. Picture viewing device according to claim 12, wherein the step projects by more than one picture thickness and less than two picture thicknesses with respect to the height of retentive element strips on the plate.

14. Picture viewing device according to claim 1, wherein, parallel to the housing wall that lies opposite the housing opening, there is provided, as a pile edge stop, a leaf spring biassed in the direction of the housing opening and wherein this leaf spring can be pressed against this housing wall by inserting the slider member.

15. Picture viewing device according to claim 1, wherein the pressure plate is narrower than the dimension of the pictures in the direction transverse to that of the movement of the slider member, or has recesses, and wherein on the housing and/or on the base of the slider member, supporting elements are provided beside the plate but beneath the pictures or in the region of the recesses on which supporting elements the entire pile to be removed rests when the pressure arrangement is disabled.

16. Picture viewing device according to claim 1, characterized by ribs extending parallel to the retentive elements across the face of the plate which faces the housing window, which ribs are arranged near to the middle of the plate between retentive element strips.

17. Picture viewing device according to claims 1 or 2, wherein the plate is biassed by the springs substantially in the direction perpendicular to the housing window but is capable of executing a rocking movement about an axis parallel to the viewing window and perpendicular to the direction of withdrawal of the slider member.

18. Picture viewing device according to claim 17, wherein the spring is constructed in one piece and is arranged to act on the plate symmetrically with respect to the direction of withdrawal of the slider member.

19. Picture viewing device according to claim 17, wherein the spring is constructed in several pieces and is arranged to act on the plate symmetrically with respect to the direction of withdrawal of the slider member.

20. Picture viewing device according to claim 19, wherein two pairs of integrally manufactured leaf springs lying one behind the other in the withdrawal direction of the slider member are provided.

21. Picture viewing device according to claim 17, wherein the springs are leaf springs which extend from the base of the housing towards the housing opening.

22. Picture viewing device according to claim 19, wherein several pairs of leaf springs are provided.

23. Picture viewing device according to claims 18 or 19, wherein four leaf springs are provided in the manner of a parallelogram guide means.

24. Picture viewing device according to claim 23, wherein the ends nearest the pressure plate of the pair of springs nearest the housing opening have narrow extensions relative to the main part of the springs, which extensions project through openings in the pressure plate and can be pressed by the separator beneath the face of the pressure plate nearest the viewing window.

25. Picture viewing device according to claim 22, wherein an auxiliary spring arrangement is provided as a buffer for at least one end edge of the plastics pressure plate.

26. Picture viewing device according to claim 17, wherein the leaf springs are fixed on the pressure plate and are supported flexibly on the housing base.

27. Picture viewing device according to claim 26, wherein the leaf springs have recesses having an outline complementary to the projections on the underside of the pressure plate, and wherein the projections are firmly connected to these leaf springs after the leaf springs have been pressed thereon.

28. Picture viewing device according to claim 26, wherein the ends of the leaf springs anchored to the housing base have an approximately T-shaped opening which engages over an approximately H-shaped projection on the housing base.

29. Picture viewing device according to claim 28, wherein the anchored end of the leaf spring has a joint defined by an angled portion.

30. Picture viewing device according to claim 1, wherein the plate is provided with retentive elements substantially over its whole extent in the direction of withdrawal.

31. Picture viewing device according to claim 30, wherein the retentive elements are arranged along straight strips extending parallel to the direction of withdrawal.

32. Picture viewing device according to claim 31, wherein the retentive elements are provided in the form of continuous strips on the pressure plate.

33. Picture viewing device according to claim 30, wherein strip-shaped intermediate spaces parallel to the direction of movement of the slider member and corresponding in length to that of the withdrawal stroke of the slider member are left between the retentive elements.

34. Picture viewing device according to claim 33, wherein the profile of the retentive covering elements, on the one hand, and of the separator, on the other hand, is so designed that a single picture clamped between the two slings substantially completely to the surface of the retentive covering elements.

35. Picture viewing device according to claim 34, wherein the retentive elements are substantially level on their face facing the housing window.

36. Picture viewing device according to claim 34, wherein the retentive elements have curved faces on their surface facing the housing window which faces correspond to the curvature of the pictures.

37. Picture viewing device according to claim 36, wherein the edge of the separator which faces the pressure plate is of a profiled design substantially parallel to the profile of curvature.

38. Picture viewing device according to claim 35, wherein the separator has recesses on its edge facing the pressure plate, the width of which recesses is considerably greater than the picture thickness.

39. Picture viewing device according to claim 30, wherein the retentive elements consist of rubber.

40. Picture viewing device according to claim 30, wherein the retentive element consist of polyurethane.

41. Picture viewing device according to claim 30, wherein the retentive elements consist of silicone rubber.

42. Picture viewing device according to claim 30, wherein the retentive elements consist of soft polyvinyl chloride.

43. Picture viewing device according to claim 30, wherein the retentive elements are cut into strip-like lengths and glued to the plate.

44. Picture viewing device according to claim 30, wherein the retentive elements are cut into strip-like lengths and embedded in recesses in the pressure plate.

45. Picture viewing device according to claim 30, wherein the retentive elements are applied in the form of a paste.

46. Picture viewing device according to claim 30, wherein the retentive elements are sprayed on.

47. Picture viewing device according to claim 30, wherein the retentive elements are applied to the finished plate in the injection-moulding process.

48. Picture viewing device according to claim 30, wherein the retentive elements are constructed by local physical influencing of the plastics material of the pressure plate during the injection operation of the plate.

49. Picture viewing device according to claims 6 and 30, wherein the retentive elements extend into the flexible part of the plate.

50. Picture viewing device according to claims 33 and 49, wherein support faces for the separator are provided beside the retentive elements in the flexible part of the plate.

51. Picture viewing device according to claim 30, wherein the retentive elements project above the surface of the pressure plate which faces the housing window by approximately one picture thickness.

52. Picture viewing device according to claim 30, characterised by cleaning elements, provided on the slider member, for the retentive elements.

53. Picture viewing device according to claims 12, 30 and 51, wherein the height of the retentive covering strips diminishes across the pressure plate towards the step of the plate, which step is provided at the edge of the plate remote from the housing opening.

54. Picture viewing device according to claim 2, wherein the disabling device is constructed so as to engage the plate and is arranged thereon, and the plate has sufficient rigidity to transfer the forces occurring during the disabling operation to all the metal springs.

55. Picture viewing device according to claim 2, wherein the disabling device is constructed so as to engage the springs.

56. Picture viewing device according to claims 54 or 55, wherein the disabling device may be actuated by means of a button movable relative to the housing for the disabling operation parallel to the direction of withdrawal of the slider member.

57. Picture viewing device according to claims 54 or 55, wherein the disabling device may be actuated by means of a button which may be displaced relative to the housing transversely to the direction of withdrawal of the slider member.

58. Picture viewing device according to claims 56 or 57, wherein, in its disabling position, the button projects beyond the housing contour.

59. Picture viewing device according to claim 55, wherein the disabling device may be actuated by means of an element disposed on the underside of the housing, which element may be rotated, tilted or pivoted into the disabling position.

60. Picture viewing device according to claim 2, wherein the disabling position of the disabling device can be recognised from the window and/or a narrow side of the housing.

61. Picture viewing device according to claims 54 or 55, wherein the plate may be moved substantially parallel to itself and away from the viewing window for the disabling operation.

62. Picture viewing device according to claim 61, wherein the plate is guided by means of metal springs approximately in the manner of a parallelogram, and the disabling device engages the plate centrically or eccentrically.

63. Picture viewing device according to claim 61, wherein the disabling device is so constructed to engage the plate that the resultant forces act in a direction substantially at right angles to and away from the viewing window.

64. Picture viewing device according to claim 56, wherein the disabling button is slidably guided in a depression in the base of the housing.

65. Picture viewing device according to claim 64, wherein the disabling button is linked to the pressure plate via a disabling tongue.

66. Picture viewing device according to claim 65, wherein the button and the tongue are of integral construction, but are flexibly joined to one another.

67. Picture viewing device according to claim 66, wherein the disabling tongue is linked flexibly to the pressure plate so as to slide in the button displacement direction.

68. Picture viewing device according to claim 65, wherein the tongue is arranged to engage the springs.

69. Picture viewing device according to claim 65, characterised by control strips on the housing base for the deflection of the tongue in dependence on the position of the button.

70. Picture viewing device according to claim 69, wherein, in the housing base, there is provided a control bar beneath which the disabling tongue is guided and by which it may be depressed towards the housing base when the button is displaced into the disabling position.

71. Picture viewing device according to claim 67, wherein the pressure plate has elongated holes in which pins shaped on the disabling tongue engage.

72. Picture viewing device according to claim 71, wherein the elongated holes are constructed in reinforcing ribs.

73. Picture viewing device according to claims 56 or 57, wherein the housing base has a depression in which the disabling button is accommodated approximately flush.

74. Picture viewing device according to claim 68, wherein the button has a control element which, during displacement into the disabling position, can be deflected into the displacement path of the slider member, so that the slider member, on being inserted into the housing, pushes the button back into the actuating position.

75. Picture viewing device according to claim 74, wherein the control element is formed by an extension of at least one of the spring-depressing arms.

76. Picture viewing device according to claim 74, wherein for the deflection of the control element a control cam is shaped on the housing.

77. Picture viewing device according to claim 74, wherein the control element is positively guided into the activating position as the slider member is inserted.

78. Picture viewing device according to claim 74, wherein the button, with its arms, may be mounted from the outer side of the housing.

79. Picture viewing device according to claim 56, wherein the button that slides in the housing includes a control element which projects through an opening in the pressure plate into the path of movement of the separator when the button is displaced into its disabling position, and may be pressed back into the activating position again by the separator when the slider member is inserted into the housing.

80. Picture viewing device according to claim 55, 56 and 79, wherein on the button there are shaped lateral arms running onto the leaf springs and thereby pressing the plate away from the housing window.

81. Picture viewing device according to claim 79, wherein the control element permits the free passage of the separator relative to the direction of withdrawal of the slider member.

82. Picture viewing device according to claim 56, wherein the disabling position of the button lies closer to the housing opening so that, when the slider member is withdrawn for the first time, after being displaced into the disabling position the button can be immediately pressed back into the activating position.

83. Picture viewing device according to claim 82, characterised by transporters for the button which are arranged on the slider member.

84. Picture viewing device according to claim 56, wherein the housing, close to that point on its base where the leaf springs are anchored, has an opening for the insertion of the button, which, when displaced for the first time along a guide means, anchors itself behind auxiliary sloping faces of the leaf springs.

85. Picture viewing device according to claim 56, wherein the button has spring-depressing arms and a hooked extension with which a counterhook on the pressure plate is associated.

86. Picture viewing device according to claim 56, wherein on the button there are provided spring-depressing arms and a hooked extension which, in the disabling position of the button, engages over a transverse bar of the spring arrangement.

87. Picture viewing device according to claim 56, wherein on the button there are arranged spring-depressing arms and the leaf springs in the region of the button stroke substantially bridge the maximum distance between the housing base and the pressure plate.

88. Picture viewing device according to claim 56, wherein on the button there are arranged spring-depressing arms with which are associated run-on cams on the leaf springs.

89. Picture viewing device according to claim 55 and 57, wherein the disabling device includes a control cam which is pivotable parallel to the housing base and by means of which the leaf springs, which arch away in the activating position from the housing base, can be extended, with the pressure plate being pulled away from the housing window.

90. Picture viewing device according to claim 89, wherein the leaf springs in the activating position of the control cam are freely moveable relative thereto.

91. Picture viewing device according to claim 1, wherein the disabling device includes a disabling element that can be moved by the pressure plate towards the picture pile, and the separator has a stepped portion to catch the edge facing it of the lowermost picture in the pile.

92. Picture viewing device according to claim 91, wherein the disabling element is a lifting pin fastened to a leaf spring.

93. Picture viewing device according to claim 92, wherein an actuating button projecting outwards through the housing base is fastened to the leaf spring.

94. Picture viewing device according to claim 91, wherein the stepped portion of the separator is a limiting edge of a slot parallel to the picture edges.

95. Picture viewing device according to claim 1, wherein the disabling device includes a catch arrangement housed in the slider member, which catch arrangement may be displaced by means of a button which is movable in the slider member and can be actuated by the fingers through a housing opening from a hidden position into operative connection with the pile of pictures.

96. Picture viewing device according to claim 1, wherein the disabling device includes pile-lifting elements arranged in the slider member, which elements can be extended towards the housing window by means of a wedge arrangement.

97. Picture viewing device according to claim 96, wherein the wedge arrangement is movable, transversely to the withdrawal direction of the slider, by means of a button which may be displaced in the housing, using a rod system.

98. Picture viewing device according to claim 15, wherein the supporting elements are closer to the housing than the lower edge of the separator and on the plate there are provided slider member-controlled means for holding the retentive elements away, at least at the end of the plate nearest the housing opening, during the movement of the slider member into the housing.

99. Picture viewing device according to claim 98, wherein the means on the plate are laterally arranged control faces and counter-control faces disposed on the supporting elements of the slider member.

100. Picture viewing device according to claim 99, wherein on the side edges of the plate which run parallel to the direction of withdrawal of the slider member, there are arranged runners forming the control faces, which, as the slider member is withdrawn, yield underneath the plate, but as the slider member is inserted are run over by control faces rigidly arranged on the slider member, so that the retentive face of the retentive elements on the plate is pressed below the level of the lowermost picture of the pile.

101. Picture viewing device according to claim 99, wherein, on the lateral ledges of the slider member facing towards the plastics pressure plate there are arranged the runners forming the counter-control faces, which, as the slider member is withdrawn, lie hidden beneath the ledges, but as the slider member is inserted, run over control faces rigidly arranged on the plate, so that the retentive face of the retentive elements on the plate is pressed below the level of the lowermost picture in the pile.

102. Picture viewing device according to claim 100 or 101, wherein each runner consists of a platelet made of self-lubricating, spring-elastic plastics material, and has a resilient strip, relative to which a projecting control face portion of the runner may be moved.

103. Picture viewing device according to claim 102, wherein the resilient strip is centrally anchored.

104. Picture viewing device according to claim 102, wherein the platelet has a swivel bearing close to one of its ends.

105. Picture viewing device according to claim 102, wherein the platelet consists of polyamide, whilst the pressure plate and the slider member are injection-mouldedfrom polystyrene.

106. Picture viewing device according to claim 102, wherein each runner is positively guided along a control cam provided on the housing base.

107. Picture viewing device according to claim 98, wherein the disabling device includes a hook assembly arranged close to the housing opening which, when actuated by the slider member, holds the pressure plate firmly for the greater part of the insertion path of the slider member.

108. Picture viewing device according to claim 107, wherein two hooked levers are provided which may be pivoted into the holding position by first actuating elements disposed on the slider member only during the return stroke of the slider member, and may be pivoted back into their releasing position by second actuating elements disposed on the slider member when the slider member has been inserted almost all the way into the housing.

109. Picture viewing device according to claim 108, wherein the hooked levers may be pivoted about pins provided on the housing base having axes at right angles to this base.

110. Picture viewing device according to claim 109, wherein the pressure plate has extensions over which the hooked levers may be pivoted.

111. Picture viewing device according to claim 108, 109, and 110, wherein the first actuating elements are resilient actuating arms arranged on lateral slider member ledges.

112. Picture viewing device according to claim 108, wherein the second actuating elements are formed by a part of the front wall of the slider member.

113. Picture viewing device according to claim 112, wherein the second actuating elements are formed by a slider member grip projecting inwards into the housing contour.

114. Picture viewing device according to claim 110, wherein the hooked levers on their sides facing the pressure plate have sloping run-on faces for the first actuating elements.

115. Picture viewing device according to claim 1, wherein the housing is composed of an upper shell and a lower shell and the two shells are constructed to interlock positively.

116. Picture viewing device according to claim 115, characterised by a guide groove provided asymmetrically in the plane of separation between the two shells.

117. Picture viewing device according to claim 116, characterised by a locking cam which is provided close to a relatively short narrow side of the housing and interrupts the guide groove.

118. Picture viewing device according to claim 116, characterised by an inwardly projecting indentation in the region of the guide groove, marking the middle of the viewing window.

119. Picture viewing device according to claim 115, wherein the upper shell and a grip piece of the slider member, which fits into the contour thereof, are manufactured integrally, are provided with a surface finish and are then separated.

120. Picture viewing device according to claim 115, wherein the edges of the upper shell and/or the lower shell parallel to the slider member direction of movement are of double-walled construction and are joined together.

121. Picture viewing device according to claim 120, wherein the housing corners are rounded at least in one plane, the rounding radius being approximately the same as the width of the double-walled edges.

122. Picture viewing device according to claim 115, wherein the housing is rectangular, when viewed looking at the housing window.

123. Picture viewing device according to claim 122, wherein the housing, viewed looking at the end face of the slider member, is substantially rectangular but is rounded with a radius of approximately half the housing height.

124. Picture viewing device according to claim 115, wherein the lower shell has a depression for a stand foot which may be folded away flush into the depression.

125. Picture viewing device according to claim 124, wherein the depression is provided in the central region of the outer side of the loewr shell between the slider member flat base portion and a disabling button.

126. Picture viewing device according to claim 124, wherein the stand foot has a head mounted in the lower shell so as to rotate relative to the housing, and a stand flexibly connected to the head.

127. Picture viewing device according to claim 126, wherein the stand foot is a plastics part manufactured in one piece.

128. Picture viewing device according to claim 126, wherein the stand has a stop supported on the lower shell for limiting the angle by which the stand can be opened out.

129. Picture viewing device according to claim 126, wherein the head may be locked relative to the housing, in preferred positions for standing the device in sideways format and in at least one upright format.

130. Picture viewing device according to claim 115, wherein the lower shell on its outer side has a stand foot attached by means of hinges.

131. Picture viewing device according to claim 130, wherein the hinge axis runs approximately diagonally to the rectangular outer side of the housing.

132. Picture viewing device according to claim 131, wherein the diagonal, viewed looking at the housing window with the slider member withdrawal direction on the right, runs from top left to bottom right.

133. Picture viewing device according to claim 131, wherein the axial direction of the hinge, one behind the other there are provided a guide portion, a snap-in portion and a stop portion for the stand foot.

134. Picture viewing device according to claim 133, characterised by two symmetrically arranged hinges close to the housing corners.

135. Picture viewing device according to claim 133, wherein the guide portion includes a roll-off edge shaped on the stand foot and a roll-off groove having a contour complementary thereto in the housing base.

136. Picture viewing device according to claim 133, wherein the snap-in portion has a snap-in pin shaped on the stand foot paraxially to the hinge, whilst in the housing base there is shaped at the edge of an opening a projection engaging over the snap-in pin, and the edge opposite the projection is the free end edge of a flat housing base portion that may be deflected resiliently.

137. Picture viewing device according to claim 133, wherein the stop portion includes a rib shaped on a resilient flat housing base portion, over which rib a locking edge on the stand foot snaps, with the particular flat portion being deflected, when the foot is opened out and folded away.

138. Picture viewing device according to claim 137, wherein the stand foot in the region of the stop portion has means for limiting the opening angle.

139. Picture viewing device according to claim 136 and 137, wherein the resilient flat portions are limited by slots transversely to the hinge axis.

140. Picture viewing device according to claim 124 or 130, characterised by a push-button for fixing the stand in a recess in the housing.

141. Picture viewing device according to claim 115, wherein in the lower shell the slider member is guided and the pressure arrangement is mounted, and the upper shell comprises the housing window and a cover frame which engages over the housing window and the contour of which is flush with the contour of the lower shell.

142. Picture viewing device according to claim 141, wherein the lower shell, after the insertion of the slider member, is welded ultrasonically to the upper shell.

143. Picture viewing device according to claim 141, wherein a window depression enclosed by the cover frame has a contour congruent with locking parts of the lower shell which project outwards from the housing contour.

144. Picture viewing device according to claim 143, wherein the locking parts are formed by a flat step of the lower shell.

145. Picture viewing device according to claim 144 and 124, or 144 and 130, wherein the stand foot forms a part of the step.

146. Picture viewing device according to claim 145, wherein the stand foot is designed to stand the non-square housing in an upright format and a sideways format at substantially the same angle.

147. Picture viewing device according to claim 115, wherein the slider member and at least one of the shells have stops and counterstops for limiting the withdrawal path of the slider member.

148. Picture viewing device according to claim 141, wherein, in the lower shell, there are provided blocking stops for the end edges of the pile and the separator has openings for these stops.

149. Picture viewing device according to claim 141, wherein the housing shells in the region of the housing opening have, on both sides of the slider member front end, wall parts that are flush therewith.

150. Picture viewing device according to claim 11, wherein the grip piece of the slider member is connected in a positively interlocking manner or is bonded to the slider member.

151. Picture viewing device according to claim 1, wherein the slider member has auxiliary elements for holding the pile of pictures.

152. Picture viewing device according to claim 151, wherein the auxiliary elements comprise a support projection projecting beyond the inner contour of the slider member.

153. Picture viewing device according to claim 151, wherein the auxiliary elements comprise resilient clamping pieces fastened to slider member side rails.

154. Picture viewing device according to claim 151, wherein the auxiliary elements comprise resilient retaining tongues shaped out of the slider member side rails.

155. Picture viewing device according to claim 14, wherein the grip base of the slider member has a flat base portion which can be gripped from the outside and which reaches underneath the pressure plate.

156. Picture viewing device according to claim 155, wherein the flat base portion extends beneath the spring ends on the plate.

157. Picture viewing device according to claim 155, wherein the flat base portion has a grip recess on the outside.

158. Picture viewing device according to claim 155 or 157, wherein the flat base portion is fitted into the contour of the housing base.

159. Picture viewing device according to claim 155, wherein the grip base on the window side of the housing is flush with the housing and has the same surface finish as the housing.

160. Picture viewing device according to claim 1, wherein the separator is designed to strike the pressure plate first of all centrally during the withdrawal of the slider member.

161. Picture viewing device according to claim 160, wherein the edge of the separator striking the pressure plate runs inclined at an angle of 10° to 25° to the vertical, whereas its trailing edge, over which the individual picture be changed slides, runs inclined at an angle of 25° to 45° to the vertical.

162. Picture viewing device according to claim 1, wherein on the slider member end face projecting from the housing there is formed a label compartment.

163. Picture viewing device according to claim 162, wherein the label compartment is formed by a transparent cover part firmly joined to the slider member and spaced at a distance from the end wall thereof, and a label can be inserted through a gap between the slider member and the cover.

164. Picture viewing device according to claim 162, wherein the label compartment is closed by a drop-cover of transparent plastics material.

165. Picture viewing device according to claim 164, wherein the drop-cover has paper-holding edges, an opening stop, and a locking mechanism which may be released when the slider member is pulled.

166. Picture viewing device according to claim 1, wherein the slider member is guided in the housing with linear contact.

167. Picture viewing device according to claim 166, wherein the slider member is supported in the direction transverse to its direction of movement only by means of projections on the housing defining substantially point-shaped contact areas.

168. Picture viewing device according to claim 151, wherein the slider member, as auxiliary elements, has holding-down bars engaging laterally over the pictures and shaped on slider member ledges ang guided along frame struts of the housing window.

169. Picture viewing device according to claim 168, wherein the holding down bars extend from the housing interior end of the slider member to approximately the middle of the slider member.

170. Picture viewing device according to claim 169, wherein the ends of the holding down bars facing the front end of the slider member are rounded.

171. Picture viewing device according to claim 1, wherein the device has at least one engaging element provided on the slider member and at least one engaging element provided on the housing for a motor-driven picture change device.

172. Picture viewing device according to claim 171, wherein the engaging elements are recesses in the housing base.

173. Picture viewing device according to claim 171, wherein the device is designed to accommodate pictures of a 9 cm × 9 cm format.

174. Picture viewing device according to claim 171, wherein the device is designed to accommodate pictures of a 9 cm × 11.5 cm format.

175. Picture viewing device according to claim 171, wherein the device is designed to accommodate pictures of a 9 cm × 13 cm format.

176. Picture viewing device according to claim 171, 173, 174 and 175, wherein the engaging elements are congruent in devices of all formats.

177. Picture viewing device according to claim 171, wherein the flat base portion of the slider member on the one hand, and the housing on the other hand, have a cylindrical opening as the engaging element.

178. Picture viewing device according to claim 177, wherein the cylindrical opening of the housing is covered by the disabling button in the disabling position thereof.

179. Picture viewing device according to claim 178, wherein, in its activating position, the disabling button has an aperture coincident with the cylindrical opening of the housing.

180. Picture viewing device according to claim 176, wherein the recesses in the case of devices of relatively short format permit a no-load stroke of the picture change apparatus corresponding to the difference in the necessary stroke from devices of a longer format.

181. Picture viewing device according to claim 180, wherein the recesses in the devices of relatively short format are constructed as elongated holes, and in the case of the devices of longest format are constructed as cylindrical openings.

182. Picture viewing device according to claim 115, wherein the lower shell has hanging eyelets.

183. Picture viewing device according to claim 182, wherein one hanging eyelet each is provided on one relatively long and one relatively short edge of the non-square base shell.

184. Picture viewing device according to claim 183, wherein the eyelet on the relatively long edge is constructed as an elongated slot for shifting the hanging point relative to the centre of gravity of the device which, in turn, depends on the number of pictures in the device.

185. Picture viewing device according to claim 183, wherein one eyelet is provided in the region of the grip base of the slider member.

186. Picture viewing device according to claim 185, wherein the other eyelet is arranged at the top when looking at the viewing window with the grip base on the right.

187. Picture viewing device according to claim 11, wherein the grip base has portions projecting inwards towards the inside of the housing by means of which portions the pile can be pushed into alignment with the housing window.

188. Picture viewing device according to claim 187, wherein the entire grip base reaches to beneath the edge, facing it, of the housing window when the slider member is pushed completely into the housing.

189. Picture viewing device according to claim 187, wherein, when the slider member is pushed into the housing, there is a free space on both sides of the grip base, within which the nearest end of the pressure plate is movable from a position beneath the separator to a position near the housing window in a direction substantially at right angles to the housing window.

190. Picture viewing device according to claim 189, wherein the free space is accessible from above when the slider member is pulled out.

191. Picture viewing device according to claim 188, wherein the contours of the grip base are constructed complementary to the contours of a cutaway portion of the housing.

192. Picture viewing device according to claim 34, wherein, during the withdrawal of the slider member, the separator touches the picture disposed on the pressure plate only at those points where the picture is not supported by retentive elements on the other side.

* * * * *